US010666798B2

(12) United States Patent
Bharrat et al.

(10) Patent No.: US 10,666,798 B2
(45) Date of Patent: May 26, 2020

(54) METHODS AND APPARATUS FOR DETECTION AND MITIGATION OF ROBOCALLS

(71) Applicant: Ribbon Communications Operating Company, Inc., Westford, MA (US)

(72) Inventors: Shaun Jaikarran Bharrat, Manalapan, NJ (US); Tie Ju Chen, Piscataway, NJ (US); Sridhar Kuppanna, Nashua, NH (US); Tolga Asveren, Bordentown, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 15/834,960

(22) Filed: Dec. 7, 2017

(65) Prior Publication Data
US 2019/0174000 A1 Jun. 6, 2019

Related U.S. Application Data

(60) Provisional application No. 62/595,311, filed on Dec. 6, 2017.

(51) Int. Cl.
*H04M 3/436* (2006.01)
*H04M 3/42* (2006.01)
(Continued)

(52) U.S. Cl.
CPC ....... *H04M 3/4365* (2013.01); *H04M 3/2218* (2013.01); *H04M 3/42059* (2013.01);
(Continued)

(58) Field of Classification Search
CPC ......... H04M 3/42059; H04M 3/42221; H04M 3/4365; H04M 3/541; H04M 3/2218; H04M 2203/556; H04M 2203/558
(Continued)

(56) References Cited

U.S. PATENT DOCUMENTS 6,971,028 B1   11/2005  Lyle et al.
2003/0076936 A1  4/2003  Locke et al.
(Continued)

FOREIGN PATENT DOCUMENTS

CA      2301147 C    2/1999
WO   2012069094 A1   5/2012

OTHER PUBLICATIONS

Notification of Transmittal of the International Search Report and the Written Opinion of the International Searching Authority, International Search Report and Written Opinion of the International Searching Authority from PCT/US19/41727 dated Oct. 3, 2019 1-8 pages.

(Continued)

*Primary Examiner* — Harry S Hong
(74) *Attorney, Agent, or Firm* — Straub & Straub; Stephen T. Straub; Michael P. Straub

(57) ABSTRACT

The present invention relates to methods, systems and apparatus for identifying and acting upon suspect robocalls. An exemplary method embodiment includes the steps of processing call records of a customer to identify calls which are possibly from a robocaller, based on at least one of i) a call characteristic or ii) a call pattern; storing calling party source identification information of the identified calls in a suspect robocall database; processing an incoming call, said processing including comparing calling party source identification information of an incoming call to the calling party source identification information in the suspect robocall database; and completing the incoming call in a standard manner if the incoming call is not in the suspect robocall database; and handling the call as a suspect robocall if the incoming calling party source identification information is in the suspect robocall database.

20 Claims, 13 Drawing Sheets

(51) Int. Cl.
*H04M 3/54* (2006.01)
*H04M 3/22* (2006.01)

(52) U.S. Cl.
CPC ....... *H04M 3/42221* (2013.01); *H04M 3/541* (2013.01); *H04M 2203/556* (2013.01); *H04M 2203/558* (2013.01)

(58) Field of Classification Search
USPC ........................................ 379/210.02, 210.03
See application file for complete search history.

(56) References Cited

U.S. PATENT DOCUMENTS

| | | | |
|---|---|---|---|
| 2010/0091671 A1 | 4/2010 | Lidstrom et al. | |
| 2012/0088471 A1 | 4/2012 | Kong et al. | |
| 2013/0182578 A1 | 7/2013 | Eidelman et al. | |
| 2014/0192965 A1* | 7/2014 | Almeida | H04M 3/436 379/70 |
| 2015/0003600 A1* | 1/2015 | Bucko | H04M 3/436 379/210.02 |
| 2017/0019291 A1 | 1/2017 | Tapia et al. | |
| 2018/0324299 A1* | 11/2018 | Sial | H04W 4/16 |
| 2019/0173898 A1 | 6/2019 | Bharrat et al. | |

OTHER PUBLICATIONS

Notification of Transmittal of the International Search Report and the Written Opinion of the International Searching Authority, International Search Report and Written Opinion of the International Searching Authority from PCT/US19/41725 dated Nov. 1, 2019 1-14 pages.

* cited by examiner

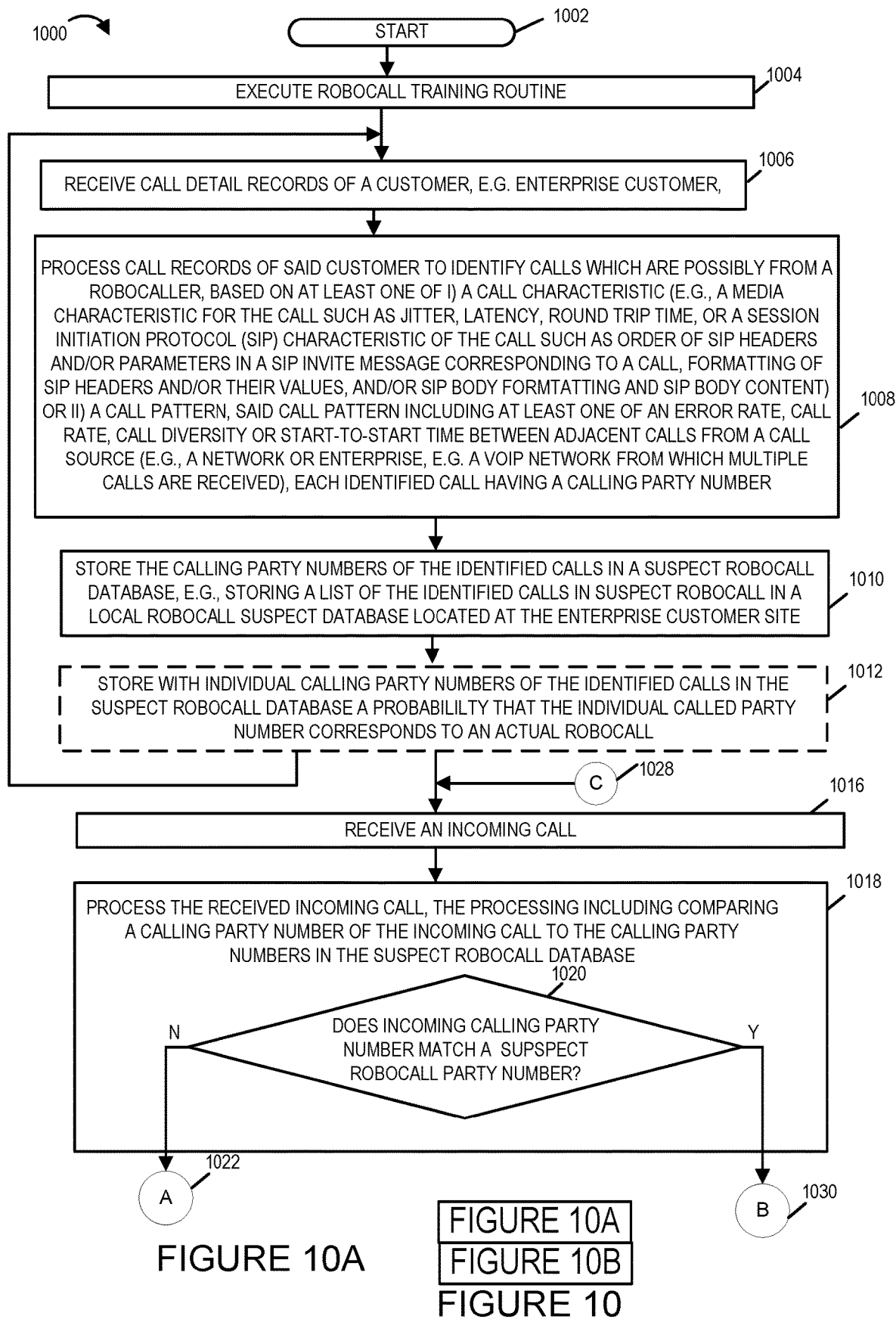

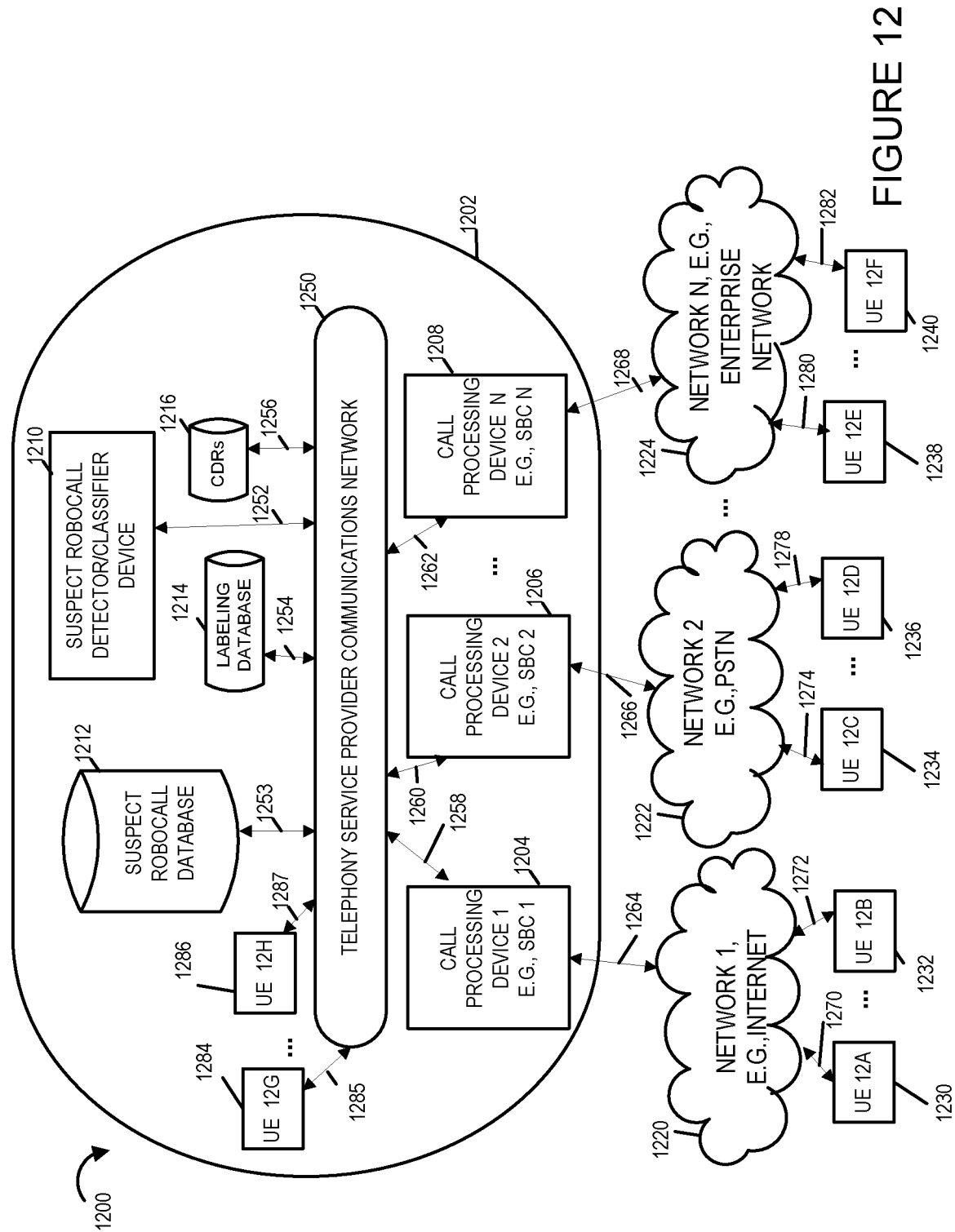

METHODS AND APPARATUS FOR DETECTION AND MITIGATION OF ROBOCALLS

RELATED APPLICATIONS

The present application claims the benefit of U.S. Provisional Patent Application Ser. No. 62/595,311 filed on Dec. 6, 2017 which is hereby expressly incorporated by reference in its entirety.

FIELD OF INVENTION

The present invention relates to communications methods, systems and apparatus for detecting, identifying and/or classifying calling numbers as actual or suspected robocallers and applying policies to calls so identified to mitigate disruption caused by robocallers.

BACKGROUND

A robocall is a mass telephony communications method wherein calls are initiated by an automated system instead of a human caller. These calls are a nuisance to individual customers and a resource drain on businesses. Robocallers can include spammers and spoofers. Features related to detecting and blocking robocalls have long been sought by the customers and businesses which have been adversely affected by robocalls. While various solutions exist, most are based on databases of known robocaller calling numbers either manually or semi-automatically maintained through customer reporting of bad parties. These complaint-based database solutions are useful but incomplete and suffer from disadvantages. For example, most of the databases are fragmented, with separate databases maintained by each carrier or service, and these databases are proprietary to the collector so information learned by one entity cannot be used in a general solution. At a national level, agencies of some governments maintain a national database of problem callers. For example, in the United States, the FCC maintains a customer complaint database. However, this database is more slowly evolving and generally considered lower quality than the commercially maintained databases.

There is a need for new and/or improved methods, systems and apparatus for overcoming the technical problem of how to effectively and efficiently detect and/or classify calls as actual or suspected robocalls. In addition, there is a need for new and/or improved methods, system and apparatus for overcoming the technical problem of detecting and/or classifying calls as actual or suspected robocalls through use of the characteristics of call(s) from a calling party without the need for a customer to report the call(s) as robocall(s). There is a further need for a solution to overcome the technical problem of how and what policies to apply to calls detected and/or classified as actual or suspected robocalls in an effective and efficient manner. There is a further need for new and/or improved methods, systems and apparatus for solving the technical problem of how to detect and/or classify calls as actual or suspected robocalls in situations where the robocaller has recently started or recently changed the calling number, the latter condition becoming increasingly frequent as bad actors iteratively circumvent the database-based filter solutions. Furthermore, there is a need for new and/or improved methods, systems and apparatus for overcoming the technical problem of how to efficiently detect and/or classify a call as actual or suspected robocall that do not require access to proprietary databases and, therein avoid the costs and licensing issues of incorporating such databases into a commercial product. There is also a need for new and/or improved methods, systems and apparatus for overcoming the technical problem of how to detect and/or classify calls as actual or suspected robocalls wherein it is not practical or desirable to require at least a subset of the local population to report or otherwise tag bad actors responsible for robocalls.

SUMMARY

The present invention is directed to various features relating to methods, systems and apparatus for detecting and/or classifying calls as robocalls and/or mitigating the disruption and negative effects of robocalls. One or more embodiments of the present invention addresses one or more of the various technical problems described above and herein and improves upon the efficiency, effectiveness and cost of detecting and/or classifying calls as robocalls and/or mitigating the disruption and negative impact of robocalls on customers and businesses. Several of the advantages provided by one or more embodiments of the invention include: the invention does not strictly depend on active feedback from called parties, it does not require online access to proprietary databases of suspect calling numbers which reduces cost and removes the issue of licensing such proprietary databases, and is resilient to robocall numbers changing on a regular basis. In most, but not necessarily all embodiments, the system's suspect database is smaller, and often much smaller than other databases which might try to track all robocalling numbers nationwide but contains more relevant calling numbers than, for example the FCC complaint database which is particularly large and often contains calling numbers which are not robocall calling numbers. In addition to the small size the robocaller database used in various embodiments includes frequently updated number information allowing the database to be compact but particularly relevant for an enterprise or other entity for which the database is maintained and potentially more useful than the contents of larger databases which do not include new robocaller calling numbers. The system allows subscribers of a service which implements the invention to flag suspect robocalls for improved subscriber experience and to take action which mitigation the disruption robocalls impose upon subscribers such as businesses.

Another advantage of various embodiments of the invention is that the suspect robocaller database is representative of the actual active robocallers on a customer network rather than the total corpus of detected robocallers. Consequently, this method is more efficient in that: (a) it is significantly smaller database; (b) the ratio of used to total entries is much higher. This translates to call processing efficiency advantages over known prior systems which use very large databases of known detected robocallers regardless of whether the detected robocallers numbers are active or not active on a customer's network.

One exemplary embodiment of the invention includes a method of processing calls to a customer (e.g., an enterprise), the method including the steps of processing call records of said customer to identify calls which are possibly from a robocaller, based on at least one of i) a call characteristic (e.g., a media characteristic for the call such as jitter, latency, round trip time, or a SIP characteristic of the call such as order of SIP headers and/or parameters in a SIP invite message corresponding to a call, formatting of SIP headers and/or their values, and/or SIP body formatting and SIP body content) or ii) a call pattern, said call pattern including at least one of an error rate, call rate, call diversity or start-to-start time between adjacent calls from a call source (e.g., a network or enterprise, e.g., a VoIP network from which multiple calls are received), each identified call having a calling party number; storing calling party source identification information (e.g., calling party numbers) of the identified calls in a suspect robocall database; processing an incoming call, said processing including comparing calling party source identification information (e.g., a calling party number) of an incoming call to the calling party source identification information (e.g., calling party numbers) in the suspect robocall database; and completing the incoming call in a standard manner if the incoming call is not in the suspect robocall database; and handling the call as a suspect robocall if the incoming calling party source identification information (e.g., calling party number) is in the suspect robocall database.

In one or more embodiments, the calling party source identification information includes one or more of the following: a calling party number, a Session Initiation Protocol (SIP) agent string, an Internet Protocol address, a source Internet Protocol (IP) address, contact header information in a call initiation request, content of first VIA header in a call initiation request, the SIP agent string being a string determined by the calling party device. The SIP agent string may be, and in some embodiments is, a SIP agent name or a SIP agent ID.

In some embodiments, the step of completing the incoming call in a standard manner includes completing the incoming call to a device corresponding to the calling party number included in the incoming call without any indication that the incoming call is a possible robocall.

In some embodiments, the step of handling the call as a suspect robocall includes at least one of: i) completing the incoming call to a device corresponding to the called party number included in the incoming call with an indication that the incoming call is a suspect robocall; ii) redirecting the incoming call to a validation service; iii) assigning the incoming call a lower incoming call priority than a non-suspect robocall when placing the incoming call in a call handling queue (thereby resulting in suspect calls having a longer delay before being answered on average than non-suspect robocalls); iv) delivering the call to voice mail or v) dropping or blocking the call.

In some embodiments, the method further comprises the step of storing with individual calling party source identification information entries (e.g., calling party numbers) of the identified calls in the suspect robocall database a probability that the individual calling party source identification information entry (e.g., calling party number) corresponds to an actual robocall; and step of processing the incoming call further includes determining, based on the stored probability associated with the calling party source identification information (e.g., calling party number) of a suspect incoming call, a call handling rule.

In some embodiments, the step of handling the call as a suspect robocall includes determining what action to take based on the probability that the incoming call is a robocall. In some such embodiments, a higher probability that an incoming call is a robocall causes a lower call handling priority to be assigned than is assigned when an incoming call has a lower probability of being a robocall.

In some embodiments, the customer is an enterprise customer; and the step of processing call records of said customer is performed on a periodic basis for calls to said enterprise customer.

In some embodiments, the method further includes the steps of generating a call classification model to be used to identify possible robocalls, said step of generating a call classification model including: accessing a set of call detail records (CDRs) of the enterprise for a period of time (e.g., month); comparing calling party numbers in the accessed call records to the calling party numbers in one or more databases of known robocalls, e.g., FCC consumer complaint database, to identify calls which are from known or likely robocallers, said identified calls being a set of previously received suspect robocalls; generating from the call detail records of the set of previously received suspect robocalls, call pattern information indicative of a suspect robocall. In some embodiments the step of generating said call classification model including using a machine learning algorithm.

In some embodiments, the method further includes the step of generating from said call pattern information indicative of a suspect call one or more call classification models which can be used when processing new incoming calls to identify suspect robocalls. In some embodiments the step of generating said one or more call classification models includes using a machine learning algorithm.

In some embodiments, the step of generating a call classification model further includes generating from the call detail records of the set of previously received suspect robocalls, a set of call characteristics indicative of a suspect robocall.

The present invention is applicable to apparatus and system embodiments wherein one or more devices implement the steps of the method embodiments. In some apparatus embodiments call processing device, e.g., SBC and each of the other apparatus/devices of the system include a processor and a memory. The memory including instructions when executed by the processor control the apparatus/device of the system to operate to perform the steps of various method embodiments of the invention.

For example, one system embodiment of invention includes a system of processing calls to a customer where the system includes a suspect robocall detector device including: a first processor configured to control the suspect call detector device to process call records of said customer to identify calls which are possibly from a robocaller, based on at least one of i) a call characteristic or ii) a call pattern, said call pattern including at least one of an error rate, call rate, call diversity or start-to-start time between adjacent calls from a call source, each identified call having a calling party number, and a first memory; a suspect robocall database for storing calling party source identification information of the identified calls which are possibly from a robocaller; and a call processing device, e.g., session border controller, including: a second processor configured to operate the call processing device to: process an incoming call, said process an incoming call including comparing calling party source identification information of an incoming call to the calling party source identification information in the suspect robocall database; and complete the incoming call in a standard manner if the incoming call is not in the suspect robocall database; and handle the incoming call as a suspect robocall if the incoming calling party source identification information is in the suspect robocall database.

The system of system embodiment 1, wherein said suspect robocall database includes fewer records than a labeling database of reported possible robocalls used to identify characteristics of robocalls.

In most, but not all, system embodiments the suspect robocall detector first processor is further configured to control said suspect robocall detector to: generate a call classification model using a machine learning algorithm to be used to identify possible robocalls, said generate a call classification model including: accessing a set of call detail records (CDRs) of the enterprise for a period of time; comparing calling party numbers in the accessed call records to the calling party numbers in at least one database of reported robocallers to identify calls which are from known or likely robocallers, said identified calls being a set of previously received suspect robocalls; generating from the call detail records of the set of previously received suspect robocalls, call pattern information indicative of a suspect robocall.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 comprises the combination of FIGS. 10A and 10B.

FIG. 10A illustrates a first part of a flowchart of an exemplary method in accordance with an embodiment of the present invention.

FIG. 12 illustrates another exemplary system in accordance with an embodiment of the present invention.

DETAILED DESCRIPTION

The present invention utilizes a machine learning (ML) application to detect and/or classifying calls as robocalls. Once calls are detected and/or classified as robocalls mitigation routines and/or actions may be, and in some embodiments are, implemented to minimize or eliminate the disruption and negative effects of the detected and/or classified robocalls. While machine learning applications have been used in a diverse set of fields, the use of a typical machine learning system is problematic in this application/scenario in that detection and/or classification is a supervised learning problem, and usable solutions generally start from large labeled datasets for training, validation, and testing. Furthermore, the typical machine learning methods assume data events are independent events, with the "information" for an event encoded within features of that event. In the telephony space of problems such as robocall detection and/or classification, labeled datasets are not readily available. A call detail record (CDR) dataset is a dataset containing information about each call processed including timing of the call, whether it was successful or not, the calling and called parties, the call duration, the ingress and egress paths utilized, and other call details is generally the information that is available. An exemplary call detail record (CDR) and the data fields/information contained therein is illustrated in the Sonus Networks, Inc. SBC Core 5.1X documentation published on Apr. 27, 2016 and which is incorporated in its entirety by reference. The call detail records are not labeled. There is of course no indication in such CDR information of whether the call was a "real" call that is a call from a person versus a robocall. Additionally, the calls from a particular calling party are not in fact independent but rather comprise a time-series distribution, and important characteristics of the calling party derive from the parameters of the time series rather than the individual events.

In the present invention, calls received by a network are examined after the fact to see if the calls were likely robocalls, i.e., that the calls met certain criteria such that the calls should be classified or identified as actual or suspect robocalls, and if so the "bad actors/users" list is updated to allow enforcing points or entities (e.g., Session Border Controllers) to block future calls from those "bad actors/users that arrive at the network.

The present invention has two aspects or features. A model building training system aspect or feature and an execution system aspect or feature.

Figure 1:
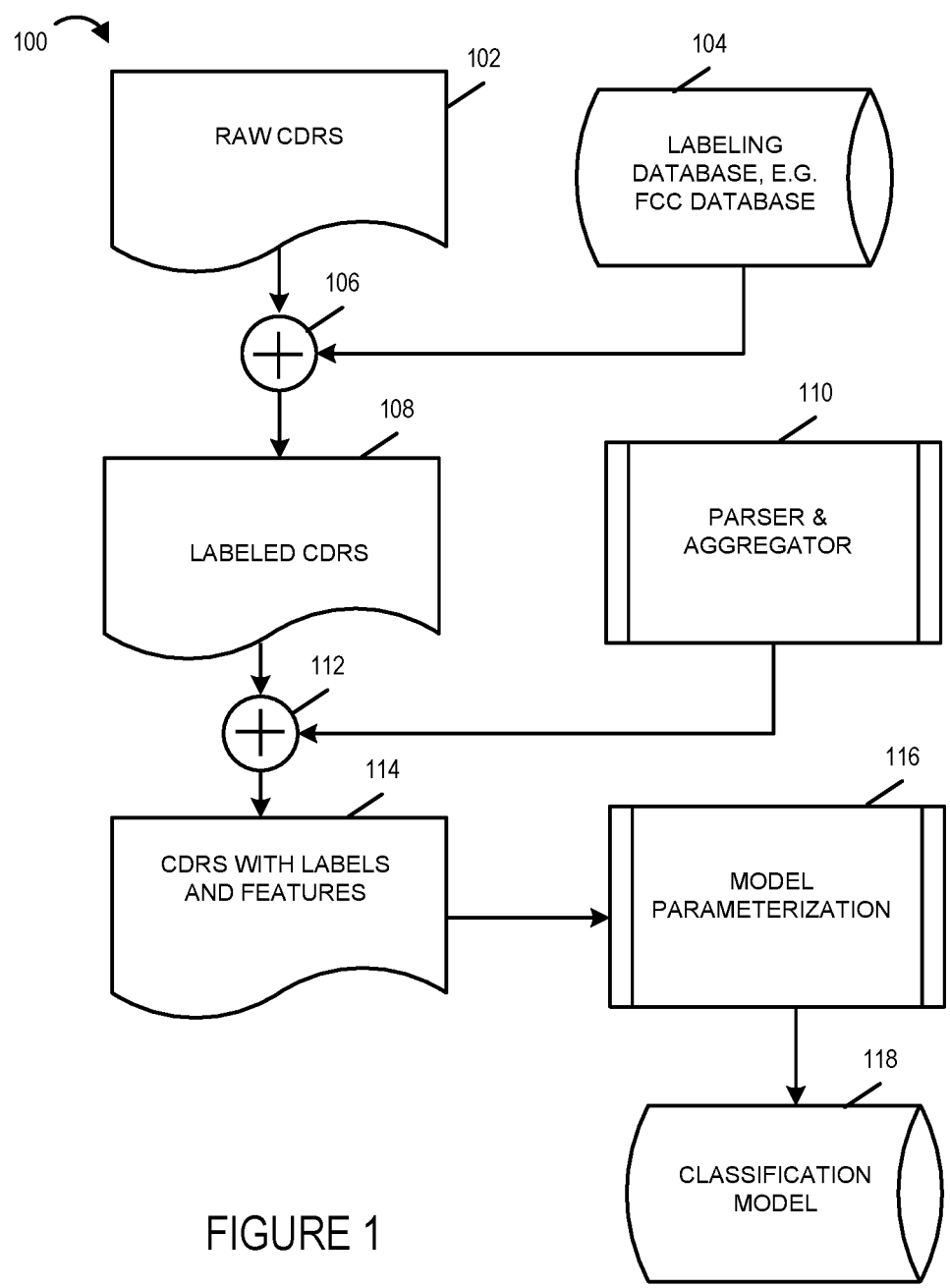
FIG. 1 illustrates an exemplary training system for building a suspect robocall classification model in accordance with an embodiment of the present invention.

Features of an exemplary model building training system is illustrated in diagram 100 of FIG. 1. Training starts with a large and long-term call detail record (CDR) dataset containing a reasonable percentage of robocalls. This CDR datasheet is illustrated in as raw CDRs 102. The raw CDR dataset 102 are tagged or labeled based on calling number matching against a database of customer identified robocall and/or nuisance calls. In FIG. 1, the labeling database of customer identified robocalls and/or nuisance calls is for example the FCC customer complaint database 104. The FCC customer complaint database 104 is a royalty free database. In some embodiments a royalty bearing database of identified robocall or nuisance callers is used or both a royalty fee and royalty bearing database of customer complaints is used. In some embodiments, multiple royalty free and/or royalty bearing databases of known robocalls is used. The use of royalty free databases, e.g., the FCC consumer complaint database, in some embodiments is preferable for customers seeking to avoid costs associated with royalty bearing databases.

As explained, the raw call detail records 102 are compared to the records maintained in the FCC database 104 and the combiner 106 generates labeled or tagged CDRs 108. The raw call detail records are in-record featurized, i.e., a set of features from within each record is determined. The labeled call detail records 108 outputted by the combiner 106 are then further processed by a parser and aggregator 110 wherein the labeled call detail records are adorned with aggregated features, i.e. a set of features determined by grouping like or similar call detail records together. The combiner 112 outputs the call detail records with labels and features 114 which is input to a model parameterization process or routine 116 that builds or generates the classification model 118 from the exploded feature set. The classification model being a model that classifies a call detail record and corresponding call as a suspect robocall and the predicted probability that the call is a robocall.

In some embodiments, the combiners 106, 112, parser & aggregator 110 and model parameterization 116 are implemented by a computer system including a memory and one or more processors, the memory including software components/instructions which when executed on the one or more hardware processors control the system to perform the functions discussed above. In some embodiments, the combiners 106, 112, parser & aggregator 110 and model parameterization 116 are implemented as separate computer systems or devices each of the separate systems or devices including one or more processors and memory. The memory including instructions to perform the steps and/or functions described above. In some embodiments, the combiners 106, 112, parser & aggregator 110 and model parameterization 116 are implemented as virtual machines running on one or more compute nodes with each compute node including a processor in a cloud system including memory. In some embodiments, the combiners 106, 112, parser & aggregator 110 and model parameterization 116 are implemented as operating system containers running on one or more compute nodes in a cloud system including memory. In some embodiments, the combiners 106, 112, parser & aggregator 110 and model parameterization 116 are implemented as operating system containers running in one or more virtual machines running in one or more compute nodes in a cloud system including memory.

Figure 2:
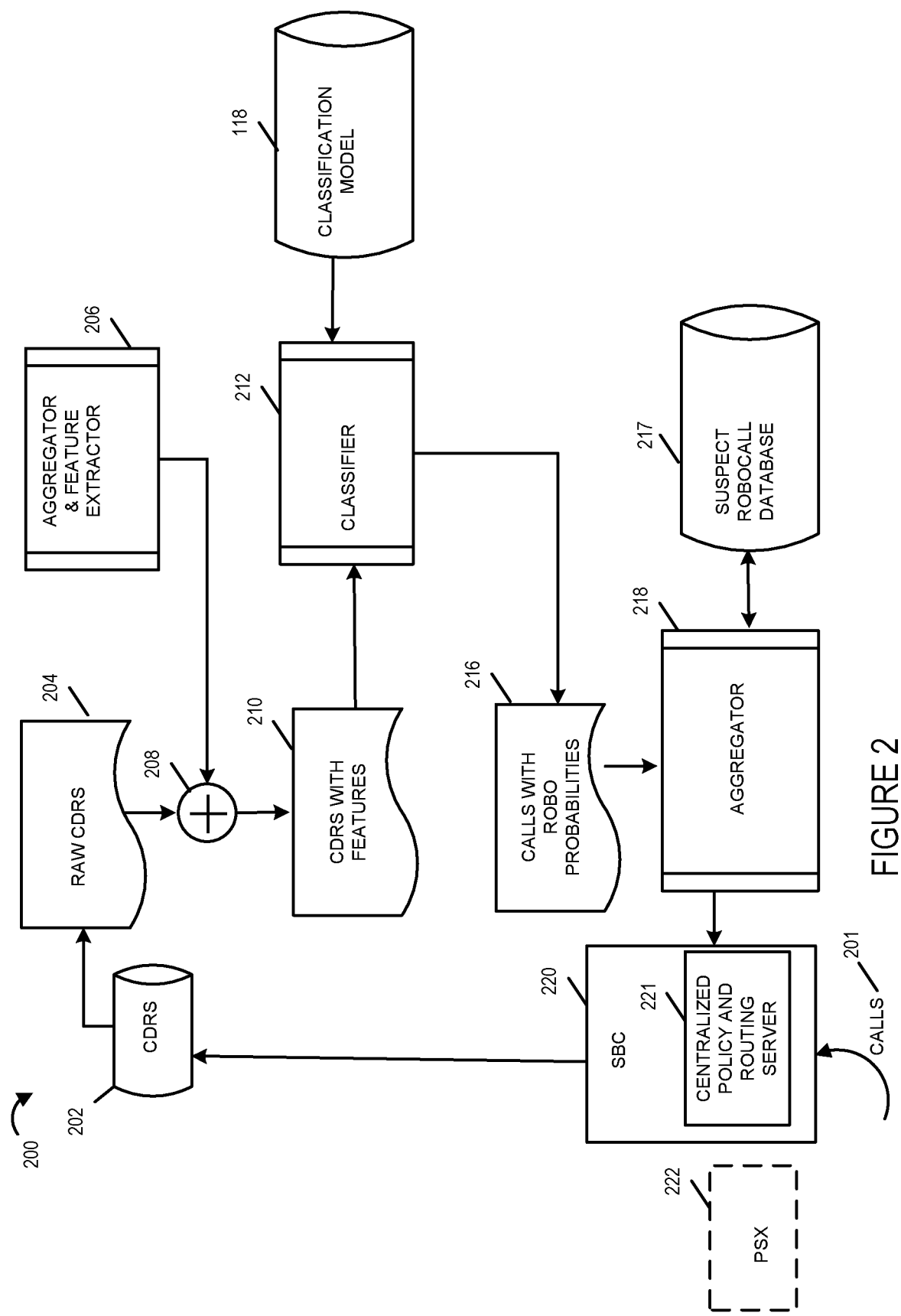
FIG. 2 illustrates an exemplary robocall system for identifying suspect robocalls and taking actions to mitigate their impact on customers in accordance with an embodiment of the present invention.

Features of an exemplary execution system 200 are illustrated in FIG. 2. It is to be understood that elements of FIG. 2 with the same label/numeral as elements in FIG. 1 are intended to be the same as or similar to the element described in FIG. 1 and a detailed description of the element will not be repeated. The system 200 starts with an empty suspect calling number database 217. As calls 201 arrive into the network at the session border controller 220, session border controller 220 generates call detail records and stores them in storage device 202, e.g., CDR database 202. In some embodiments, the SBC stores the CDRs in its own memory instead of or in conjunction with storage of the generated CDRs in storage device 202. At periodic intervals, the system featurizes the call detail records 204 with both in-record features and aggregated features. This is shown by the raw CDRs 204 which have been generated by the session border controller 220 when they are combined and the aggregator & feature extractor 206 processes the CDRs so that the combiner 208 outputs the CDRs with features 210. Each of the featurized CDRs over the last interval is then run through the classification model to generate a predicted robocall probability, and for each calling number, the predicted probabilities are combined and checked against a threshold. This is illustrated in FIG. 2 where the CDRs with features 210 is input to classifier process/routine 212 which generates a predicted robocall probability for each of the calls using the classification model 118 and outputs the calls with a robocall generated probability 216 to aggregator 218. The aggregator 218 checks the robocall numbers predicted probability against a threshold and calling numbers with predicted probabilities exceeding the threshold are then added to the suspect database 217. The aggregator also determines a severity level of the suspect calling numbers and reports or sends it to a session border controller 220 which includes a centralized policy and routing server (PSX 221) or which communicates with an external centralized policy and routing server, e.g., Sonus PSX 222, which pushes/sends policies into the network to affect new calls to minimize, address and/or eliminate the disruption of suspect calling numbers corresponding to suspect robocalls. It has been estimated that one needs about 50 million call detail records to find approximately 100,000 robocalls when using the current FCC complaint database.

While a session border controller 220 has illustrated in system 200 other call processing devices may be, and in some embodiments are used in place of the session border controller 220. For example, a Private Branch Exchanges (PBX), IP to PSTN gateway, telephony application server or other telephony call processing device may be and in some embodiments are used in place of the session border controller 220.

In an exemplary embodiment of the invention the only in-record feature is the call duration. The group features are computed by aggregating by calling number over an interval length of one hour. In this exemplary embodiment, there are four group features. The four group features are: (1) error rate, (2) call rate, (3) call diversity, (4) start-to-start time for adjacent calls.

The error rate is defined as the ratio of calls with a failure response code to total calls.

$$\text{Error rate} = (\text{calls with a failure response code})/(\text{total calls})$$

The call rate is the average call per second (cps) over the interval (e.g., time interval in seconds).

$$\text{Call rate} = (\text{average calls per second})/(\text{interval in seconds})$$

The call diversity is the ratio of unique called party numbers to total called numbers.

$$\text{Call diversity} = (\text{unique called party numbers})/(\text{total called numbers})$$

The final feature is the start-to-start time for adjacent calls. This feature, which is effectively a lag one function, approximates the inter-call duration but is significantly simpler to compute when simultaneous calling is present. These features to be used in identifying suspect robocalls were chosen after manual analysis of the call detail record information available to determine the parameters which are important in identifying and determining suspect robocalls.

The machine learning classification model in a first exemplary embodiment is a logistic regression model which may be implemented in the Java programming language. Given the very low dimensionality of the feature space (only four features), the model parameters are determined by iteration of the weight space. Standard machine learning techniques for cross validation and model testing are used with 80% of the call detail record set being used for model training and cross validation and the remaining 20% being used for model testing.

As previously discussed in connection with FIG. 2, the run-time execution of the system uses a dynamically modified suspect database coupled with policies distributed into the network in which calls where being received. The suspect database 217 contains a table of suspect calling numbers along with a probability that the calling number is a robocaller. The system starts with an empty suspect database. When an entry is added to the suspect database, a remediation action may be undertaken. For example, for a calling number having an average robocall probability, the action may be, and in some embodiments is, the installation of a routing policy in the network to modify the calling display information to indicate that the call is suspect. With this policy in place in the network, new calls from that calling party will be tagged as such to warn the called party. For calls having a calling number with a high robocall probability, the action may be, and in some embodiments is, to install a routing policy in the network to modify the routing information for calls having the calling number with the high robocall probability to either immediately redirect or reject the calls, or to route them to a validation service. The determination of whether the calling number has an average or high probability is based on whether the probability for the calling number equals and/or exceeds a average probability threshold or a high probability threshold respectively.

The remediation routing policy for suspect routing calls may be, and in some embodiments are, generated based on the called party to whom the suspect call is being directed. For example, calls to financial institutions such as banks or stock trading institutions may not be dropped but may be assigned a lower priority than non-suspect incoming calls. In some embodiments, the remediation routing policy action for a calling number identified or detected to be a suspect robocall is changed as the probability of the calling number being a robocall changes such as for example going from a probability below a low probability threshold to a probability above the low probability threshold. The suspect robocall probability thresholds and actions based on equaling or exceeding said thresholds in some embodiments are configurable. As time passes and additional data becomes available with each interval, the aggregate probability for the calling number is adjusted. Additionally, correcting false positives, that is cases in which a calling number is incorrectly determined to have an average or high probability of being a robocall but is not a robocall, is addressed by allowing the system to pass at least some calls from the calling number to allow a recipient of the call to determine whether the call is actually a robocall or is not a robocall and when it is not a robocall to white list the calling number. In some cases the suspect call is directed to a validation service which will then white list the call if it is not a robocall. In such cases, the calling number determined to be a false positive is removed from suspect database and routing policy changes are pushed/communicated to the network to treat the call normally that is as not being a robocall. A white list database filter may also be implemented that is used to adjust the probabilities generated by the classifier 212 to set the robocall probability to zero for calls which have verified as not being robocalls. In some embodiments false positive identification of suspect robocalls is determined by not blocking all calls identified with a high probability of being a robocall but allowing some calls through and monitoring activity on the call such as whether the calling party actually speaks and then modifying the probability assigned to the calling number.

To avoid the problem of an unbounded database becoming too large, a calling number may be removed from the database after a predetermined amount of time during which no call attempts where received from the calling number.

In some embodiments, once an action, e.g., routing change, has been implemented for a suspect calling number, the calling number is excluded from future training iterations.

While the invention has been described in connection with calling party numbers, the calling numbers may be replaced and/or supplemented with other calling party source identification information including for example, identifying characteristics of the calling party and/or other source identifiers of a call such as for example a session origination address, an Internet Protocol address and port number, a Session Initiation Protocol (SIP) message origination address, source IP address and Session Initiation Protocol agent identifier, source identifier included in SIP contact header information, source identifying information included in the first SIP VIA header. The calling party source identification information merely needs to identify a particular calling source and be determinable from an initial call request. For example, the suspect calling number records in the suspect database may be augmented to include other source identifiers associated with or corresponding to the suspect calling number so that actions may be taken when calls are identified as coming from source identifiers corresponding to the calling number such as displaying a message to the recipient that it is a suspicious call, blocking the call, re-directing the call to a validation service, giving the call lower priority than other calls routed to the same destination which are not suspicious calls, or re-directing the call to voice mail service. Descriptions of Session Initiation Protocol INVITE request messages and headers is described in the "SIP: Session Initiation Protocol" Request for Comment 3261 published Jul. 3, 2002 by the Internet Engineering Taskforce (IETF) and last revised May 16, 2017

In a second embodiment, the machine learning model is a regularized logistic regression model. While in the previously discussed exemplary implementation the features were a small, hand-selected set based on an understanding of the important parameters about robocalls determined from manual analysis of call detail records, there are many more features of a call which may be relevant for a more accurate determination of robocalls. As an example, for calls sourced from Voice Over Internet Protocol (VOIP) networks or endpoints, there is additional information in the Session Initiation Protocol SIP data in the received SIP INVITE message. A VOIP-based robocaller may easily cycle through a calling number block, but is more difficult to continuously vary SIP parameters such as the Internet Protocol (IP) signaling information, Session Description Protocol (SDP) parameters, user-agent details, etc. since some of these types of changes would cause the call to fail outright, and others are typically generated by the underlying SIP stack and not under application control. An important change in the second embodiment's model is the inclusion of many more features into the model wherein as many features as makes sense will be included in the model. This ensures that any potentially useful information is not discarded, especially given the additional information available for VOIP calls.

In the embodiment with only a few features a brute-force solution of the model parameters was used, however in the second embodiment with a vastly greater number of features potentially in the hundreds of features a brute-force solution of the model parameters is not possible. Instead in the second embodiment, the model is implemented with a machine learning framework that efficiently solves the model parameter problem. Additionally, in this second embodiment once again due to the now large feature space, the model will have to be regularized. Since many of the features being analyzed are irrelevant, an L1 normalization which causes useless parameters to be automatically dropped from the model is used in the exemplary second embodiment. L1 normalization is also known as least absolute deviations (LAD), least absolute errors (LAE). It minimizes the sum of the absolute differences between the target value and the estimated values.

In the second embodiment, the classification model will be the one generated by the training model discussed above using the machine learning on a large number (e.g., 100s of features). The run-time execution system for the second embodiment is the same as shown and discussed above in connection with system 200 illustrated in FIG. 2. While the classification model and its performance will be changed, once the robocall probability are generated from the classification model the updating of the suspect database and applying policies into the network remains the same.

Listed below are additional exemplary parameters which may be, and in some embodiments are used for featurization.

i. Media Based Parameters

Media characteristics such as for example jitter, latency, round-trip-time (RTT) may be, and in some embodiments are, used as parameters. These parameters would be mainly applicable for cases where a number of RTP streams are originating from the same location and/or network address such as for the cases where an RTP stream is originating from the robocalling entity and is not terminated in-between, e.g., for transcoding.

In cases where it is known a priori that the call is transcoded (based on configuration, RTP stream is originating from a well-known core network address or it is determined that it probable (e.g., RTP stream is originating from an address from which a very large number of calls are originating including non-robocalls), and if robocall probing is desired (for example based on a higher than normal call volume), a session renegotiation with a codec expected to behave in pass through mode, e.g., G.711, is performed.

Media static value ranges are assigned a numeric value, which is configurable in terms of number of ranges, range start and end values and the numeric value for each range. For example with respect to latency the following values may be assigned:

Latency-1[10 ms-30 ms]=1
Latency-2[31 ms-50 ms]=2
Latency-3[51 ms-80 ms]=3
Latency-4[81 ms and above]=4

A "latency score" for the call is determined based on the measured latency value. For example a measured latency value of 63 ms would correspond to "3".

Each media metric value is then input into the machine learning algorithm as a parameter.

ii. SIP Based Parameters

SIP based parameters to be inputted into the machine learning algorithm include:

Order of SIP headers/parameters in SIP message, e.g., SIP INVITE message;

The way SIP headers/parameters are formatted and their values in SIP messages, e.g., SIP INVITE message The way SIP message bodies are formatted/their values, e.g., SIP INVITE message bodies and the SDP offer messages included therein.

The following is a list of exemplary SIP based parameters that may be, and in some embodiments are, inputted into the machine learning algorithm to generate the classification model.

1. Is Tel-URI or SIP-URI used in From/To headers?
2. Is "user=phone" parameter used in From/To header?
3. Is "< >" used in Request-URI, To/From headers?
4. CSeq value used.
5. Is "port" used in Request-URI?
6. Whether Contact header is in IP Address or FQDN form?
7. Does Request-URI, Contact header have "transport" parameter?
8. Are "empty spaces" used between parameters in Request-URI, From/To/Contact headers, if so how many?
9. Whether Contact header has following feature-tags: audio, automata, class, duplex, data, control, mobility, description, events, priority, methods, schemes, application, video, language, type, isfocus, actor, text, extensions.
10. Number of Route, Record-Route headers
11. Whether a single header with multiple values or multiple header instances are used if there are more than one Route/Record-Route headers.
12. Order of To/From/Contact/CSeq headers.
13. Which of the following option-tags are present in Supported/Require headers: 199, answermode, early-session, eventlist, explicitsub, from-change, geolocation-http, geolocation-sip, gin, gruu, histinfo, ice, join, multiple-refer, norefersub, nosub, outbound, path, policy, precondition, pref, privacy, recipient-list-invite, recipient-list-message, recipient-list-subscribe, record-aware, replaces, resource-priority, sdp-anat, sec-agree, siprec, tdialog, timer, uui.
14. Is P-Early-Media header present?
15. Is P-Asserted-Id header present?
16. Is PRACK/UPDATE used during session negotiation?
17. Whether c-line is used as a session or media attribute in SDP.
18. List of offered codecs and their order.
19. Dynamic payload values used for codecs.
20. Clockrates used for applicable codecs.
21 fmp values used for codecs.
22. Is ptime/maxptime used?
23. Is RS/RR bandwidth modifier used?
24. SDP o-line username, sess-id, sess-version formats.
25. Is SDP i-line used?

In connection with system 200 illustrated in FIG. 2, in some embodiments of system 200, the combiner 208, aggregator & feature extractor 206, classifier 212, aggregator 218 and optional PSX 222 are implemented by a computer system including a memory and one or more processors, the memory including software components/instructions which when executed on the one or more hardware processors control the system to perform the functions discussed above. In some embodiments, the combiner 208, aggregator & feature extractor 206, classifier 212, aggregator 218 and optional PSX 222 are implemented as separate computer systems or devices each of the separate systems or devices including one or more processors and memory. The memory including instructions to perform the steps and/or functions described above. In some embodiments, the combiner 208, aggregator & feature extractor 206, classifier 212, aggregator 218 and optional PSX 222 are implemented as virtual machines running on compute nodes in a cloud system including memory.

The databases 104, 202, and 217 are implemented on storage devices and/or memory devices. In some embodiments, the databases are implemented on solid state storage devices that support fast access times to minimize delays.

Figure 3:
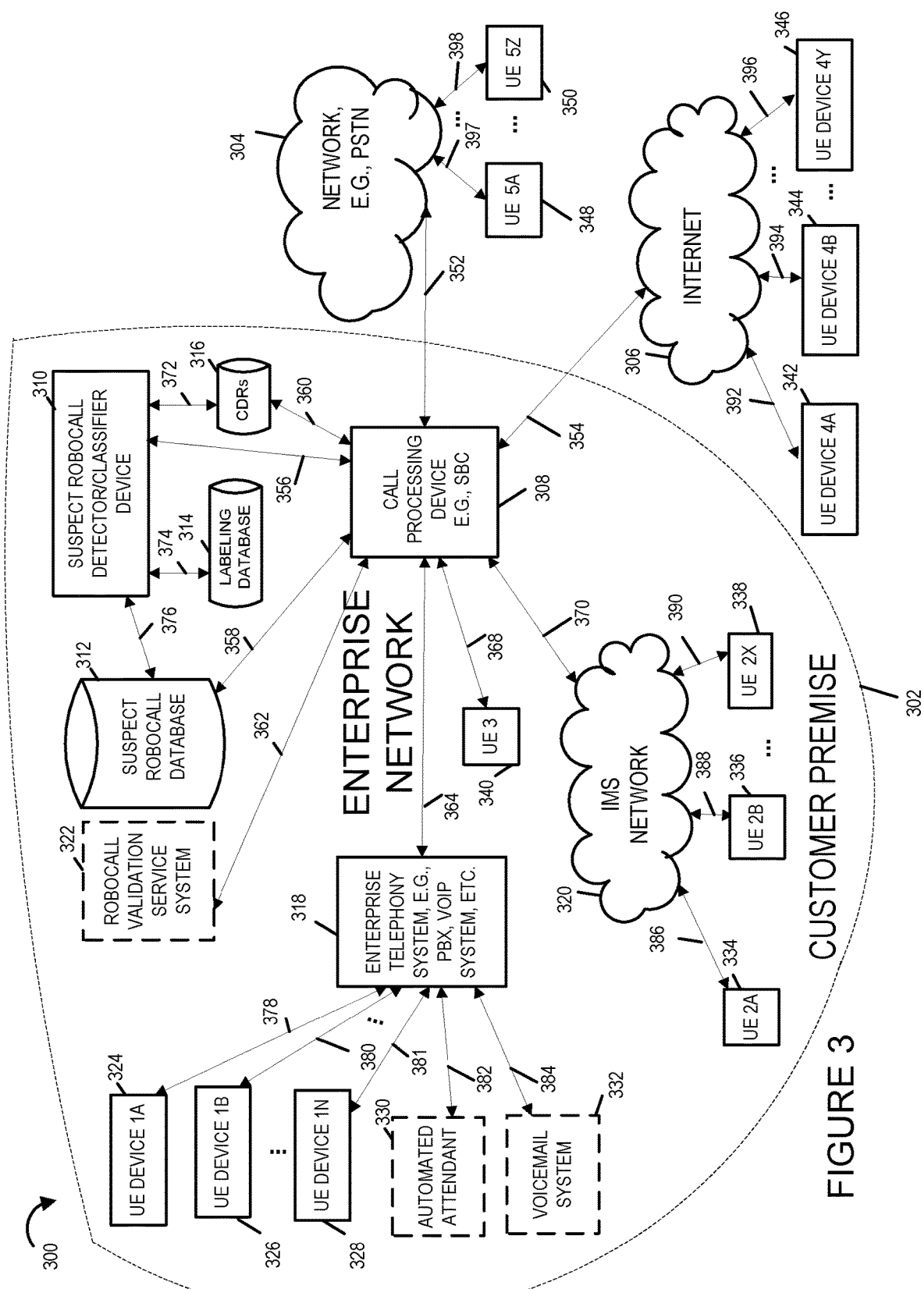
FIG. 3 illustrates an exemplary system in accordance with an embodiment of the present invention.

System 300 of FIG. 3 illustrates an exemplary system in accordance with an embodiment of the present invention. The system 300 includes a customer enterprise network 302, an external network 304, e.g., Public Switched Telephone Network (PSTN) 304, and an external Internet Protocol network, e.g., the Internet. In the exemplary embodiment, the customer enterprise network is a private network owned for example by a customer such as business and the communications equipment is located on the customer's premises. The Internet 306 has coupled to it a plurality of communications devices UE device 4A 342, UE device 4B 344, . . . , UE device 4Y 346 where Y is a positive integer number. The communications devices UE device 4A 342, UE device 4B 344, . . . , UE device 4Y are coupled to the Internet 306 via communications links 392, 394, . . . , 396 respectively. Exemplary types of communications devices include phones, computers, mobile phones, internet phones, Voice Over Internet (VOIP) phones, IP phones, SIP based communications devices, laptops, tablets, smartphones, and robocallers (i.e., devices that make robocalls).

The network 304, e.g., PSTN, is a telephony network including communications devices UE 5A 348, . . . , UE 5Z 350, where Z is a positive integer number. The communications devices UE 5A 348, . . . , UE 5Z 398 are coupled to the network 304 via communications links 397, . . . , 398 respectively.

Enterprise network 302 includes a call processing device 308, e.g., a Session Border Controller, suspect robocall detector/classifier device 310, suspect robocall database 312, labeling database 314, e.g., copy of FCC customer complaint database, customer call detail records database 316, enterprise telephony system 318, e.g., PBX, VOIP system, etc., an IMS network 320, an optional robocall validation service system 322, an optional automated attendant device 330, an optional voicemail system 332, a plurality of communications devices and communications links which couple the devices, systems and networks included in the enterprise together. For the sake of simplicity, the call processing device 308 in the exemplary system 300 is explained using an exemplary embodiment where the call processing device 308 is a Session Border Controller (SBC). However, it should be understood that the invention is not limited to the call processing device 308 being an SBC. For example, the call processing device 308 can and in some embodiments is one of the following an Enterprise telephony system, a Private Branch Exchange, IP to PSTN gateway, a telephony application server, or telecommunications switching equipment. Communications devices UE device 1A 324, UE device 1B, . . . , UE device 1N, where N is a positive integer number are coupled to the enterprise telephony system 318 via communications links 378, 380, . . . , 381 respectively. The optional automated attendant device 330 is coupled to enterprise telephony system 318 via communications link 382. In some embodiments, automated attendant features are included in the enterprise telephony system. In some embodiments, the automated attendant system is coupled to the Session Border Controller 308 instead of or in addition to the enterprise telephony system 318. The voicemail system 332 is coupled to enterprise telephony system 318 via communications link 384. In some embodiments, the voicemail system features are incorporated into the enterprise telephony system. In some embodiments, the voicemail system 332 is coupled to the SBC 308 instead of or in addition to the enterprise telephony system 318. The optional robocall validation service system 322 is coupled to the SBC 308 via communications link 362. In some embodiments, the robocall validation service system is incorporated into or coupled to the enterprise telephony system. In some embodiments, the robocall validation service system is operator by a third party service and is not located on the customer premises but is coupled to one of the external networks 304 or 306.

The enterprise telephony system is coupled to the SBC 308 via communications link 364, communications device UE 3 340 is coupled to the SBC 308 via communications link 368.

Communications devices UE 2A 334, UE 2B 336, . . . , UE 2X 338 are coupled to IP Multimedia Subsytem (IMS) network 320 via communications links 386, 388, . . . , 390 respectively.

Suspect robocall detector/classifier device 310 is coupled to suspect robocall database 312, labeling database 314, and customer enterprise CDRs database 316 via communications links 376, 374, and 372 respectively.

SBC 308 is coupled to external network 304, Internet 306, IMS network 320, UE 3 340, enterprise telephony system 318, robocall validation service system 322, suspect robocall database 312, suspect robocall detector device 310 and enterprise customer CDRs database 316 via communications links 352, 354, 370, 368, 364, 362, 358, 356, and 360 respectively.

Exemplary types of communications devices include phones, computers, mobile phones, internet phones, Voice Over Internet (VOIP) phones, IP phones, SIP based communications devices, laptops, tablets, smartphones, and robocallers (i.e., devices that make robocalls). It is to be understood that different types of communications devices are coupled to the different networks depending on the interfaces included in the communications devices, the type of protocols supported and the type of network to which the communications device is coupled. Robocall devices are communications devices coupled to the PSTN network 304 and/or the Internet 306 in the present system that include automated calling devices such as telemarketers as well as electronic spammers and spoofers, e.g., communications devices that spoof (e.g., communicate under a false identity for example by assuming the identity or emulating the identity of other communications devices).

While in the exemplary embodiment, the SBC 308 is located on the customer premise and is part of the enterprise network, the SBC 308 may be, and in some embodiments is located outside of the customer premise and part of one of the external networks. Whether the SBC 308 is located on the customer premise as part of the enterprise network 302 or located externally to the customer premise and is part of an external network, the SBC 308 is an network edge device that provides ingress and egress call establishment and call termination services for the enterprise network. Incoming calls are established via the SBC 308 with incoming calls or at least the signaling related to their establishment and termination passing through the SBC 308. The SBC 308 is sometimes implemented in accordance with call processing device 400 illustrated in FIG. 4. In some embodiments, the SBC 308 includes a policy and routing server that communicates policies and routing decision to other devices in the enterprise network such as for example the enterprise telephony system and network devices responsible for routing calls in the IMS network 320.

System 1200 of FIG. 12 illustrates another exemplary system in accordance with an embodiment of the present invention. The system 1200 includes a telephony service provider network 1202, a plurality of external networks including an external network 1 1220, e.g., Internet, an external network 2 1222, e.g., Public Switched Telephone Network (PSTN), . . . , an external network N 1224 (where N is a positive integer number), e.g., a private enterprise network, and a plurality of communications links which couple the devices and networks together.

Network 1 has coupled to it a plurality of communications devices UE device 12A 1230, . . . , UE device 12B 1232. The communications devices UE device 12A 1230, . . . , UE device 12B 1232 are coupled to the network 1 via communications links 1270, . . . , 1272 respectively.

The network 2 1222, e.g., PSTN, is a telephony network including a plurality of communications devices UE 12C 1234, . . . , UE 12D 1236. The communications devices UE 12C 1234, . . . , UE 12D 1236 are coupled to network 2 1222 via communications links 1274, . . . , 1278 respectively.

The network N 1224, e.g., private enterprise network, is a telephony network including a plurality of communications devices UE 12E 1238, . . . , UE 12F 1240 The communications devices UE 12E 1238, . . . , UE 12F 1240 are coupled to network N 1224 via communications links 1280, . . . , 1282 respectively.

Exemplary types of communications devices coupled to networks 1, 2, . . . , N and the communication network 1250 include phones, computers, mobile phones, internet phones, Voice Over Internet (VOIP) phones, IP phones, SIP based communications devices, laptops, tablets, smartphones, and robocallers (i.e., devices that make robocalls). It is to be understood that different types of communications devices are coupled to the different networks depending on the interfaces included in the communications devices, the type of protocols supported and the type of network to which the communications device is coupled. Robocall devices are communications devices coupled to the PSTN network 304 and/or the Internet 306 in the present system that include automated calling devices such as telemarketers as well as electronic spammers and spoofers, e.g., communications devices that spoof (e.g., communicate under a false identity for example by assuming the identity or emulating the identity of other communications devices).

The telephony service provider telephony network 1202 includes a plurality of call processing devices, e.g., SBCs (call processing device 1 1204, call processing device 2 1206, . . . , call processing device N, where is a positive integer number), a suspect robocall detector/classifier device 1210, suspect robocall database 1212, labeling database 1214, e.g., copy of FCC customer complaint database, customer call detail records database 1216, a plurality of communications devices (UE 12G, . . . , UE 12H), a communications network 1250 and a plurality of communications links which couple the devices of the telephony network together so that they can exchange signals, data and information. For the sake of simplicity, the call processing devices in the exemplary system 1200 is explained using an exemplary embodiment where the call processing devices are Session Border Controllers (SBCs). However, it should be understood that the invention is not limited to the call processing devices being SBCs. For example, the call processing devices can include Enterprise telephony system, a Private Branch Exchange, IP to PSTN gateway, a telephony application server, or other telecommunications switching equipment.

Call processing device 1 1204, call processing device 2 1206, . . . , call processing device N are coupled to the communications network 1250 via communications links 1258, 1260, . . . , 1262 respectively. Suspect robocall detector/classifier device 1210, suspect robocall database 1212, labeling database 1214, and CDRs database 1216 are coupled to the communications network 1250 via communications link 1252, 1253, 1254, and 1256 respectively. Communications devices 1284, . . . , 1286 are coupled to the communication network 1250 via communications links 1285, . . . , 1287 respectively.

Call processing device 1 1204 is coupled to external network 1 1220 via communications link 1264. Call processing device 2 1206 is coupled to external network 2 1222 via communications link 1266. Call processing device N is coupled to external network N via communications link 1268. The call processing devices are edge devices which are used for ingress and egress traffic into and out of the service providers telephony network 1202.

While in the exemplary system 1200, the call processing devices are shown as located in the telephony service provider network, in some embodiments one or more of the call processing devices is instead located in the external networks. Whether the call processing devices are located in the telephony service provider network enterprise network 1202 or located in the external network and are part of an external network, the call processing devices are network edge devices that provide ingress and egress call processing functionality. Incoming calls are established via the call processing devices 1, . . . , N with incoming calls or at least the signaling related to their establishment and termination passing through the call the processing devices. One or more of the call processing devices 1204, 1206, . . . , 1208 may be, and sometimes are, implemented in accordance with call processing device 400 illustrated in FIG. 4. In the embodiment of system 1200, the call processing devices include a policy and routing server that communicates and/or implements policies and routing decision to other devices in the telephony server provider network. In some embodiments, the policy and routing server functionality is implemented in separate devices from the call processing devices such as, for example, PSX devices illustrated as an optional device in FIG. 2 and discussed as an optional device in connection with system 200 of FIG. 2 and system 300 of FIG. 3. In the system 1200 of FIG. 12, the call processing device 1 includes a master policy and routing server that generates policy and routing decisions and distributes them to the policy and routing servers in the other call processing devices in the telephony service provider network 1202. The suspect robocall detector/classifier device 1210 may be, and in some embodiments is, implemented in accordance with the suspect robocall detector/classifier device 600 discussed below.

Another method of implementing an embodiment of the invention will now be described in connection with the system 1200 of FIG. 12. The implementation is similar to that previously described in connection with the system 100 and 200 of FIGS. 1 and 2 except that the CDR datasets are combined datasets for calls being processed by the plurality of incoming calls being processed by the call processing devices of the telephony service provider network 1202 and the actions to be taken are distributed to each of the call processing devices from a master policy and routing server included in the call processing device 1 1204.

The call processing devices 1, . . . , N of the telephony service provider network 1202 store their call detail records in the call detail record (CDRs) database 1216. Training commences with a large and long-term call detail record dataset containing a reasonable percentage of robocalls, the call detail record dataset being a combination of the call detail records received from the plurality of call processing devices in the telephony service provider network 1202. The suspect robocall detector/classifier device 1210 tags or labels the raw CDR dataset based on whether the CDR matches a calling number in the labeling database of identifies robocalls, identifying the CDR as a robocall or not a robocall based on whether the CDR contains a calling party number matching a number in the labeling database 1214. The labeling database dataset may be, and in some embodiments is, the FCC consumer complaint database. The labeling database may be comprised of database from royalty free or royalty bearing databases but must include previously identified robocalls. The suspect robocall detector/classifier device 1210 then generates a classification model as described in connection with system 100. As calls come into the call processing devices of the telephony service provider, the call processing devices generate call detail records and store them in the CDRs 1216 database. The suspect robocall detector/classifier device 1210 then on a periodic basis accesses additional combined CDR datasets stored in CDRs 1216 database by the call processing devices 1204, 1206, and 1208, retrieves the combined CDRs, featurizes the call detail records with both in-record and aggregated features. Each of the CDRs within the last interval are then applied to the classification model to generate a predicted robocall probability for each of the calls using the classification model. The suspected robocall detector/classifier device 1210 then checks to determine whether calls with a probability over a specified threshold are already included in the suspect robocall database and, if not, they are added to the suspect robocall database. The suspect robocall detector/classifier device 1210 also determines a severity level of the suspect calling numbers reports and/or sends them the call processing device 1204 which includes a centralized or master policy and routing server which then pushes/sends policies to the other call processing devices to affect new calls to minimize, address and/or eliminate the disruption of suspect calling numbers corresponding to suspect robocalls. The policies are typically actions to be taken upon receipt and identification of a suspect robocall based on a probability of the call being a robocall. Various exemplary actions which may be taken are discussed in connection with method 1100 discussed below. When a call enters the telephony service provider network 1202 it will be received at one of the call processing devices 1 1204, 2 1206, . . . , 3 1208. The call processing device upon receipt of a call initiation request, e.g., SIP INVITE request, will check if the calling party number is in the suspect robocall database. If it is then the call processing device will determine what action to take with respect to the call initiation request based on the stored probability that the suspect call is a robocall and the policy and routing information determined and distributed by the master or central policy and routing server included in the call processing device 1 1204. Actions include for example, blocking or dropping the call, inserting a warning to the call receipt that the call is suspected of being a robocall, giving the call a lower priority than other non-suspected robocalls, or directing the robocall to a robocall validation system or a voicemail system.

Figure 4:
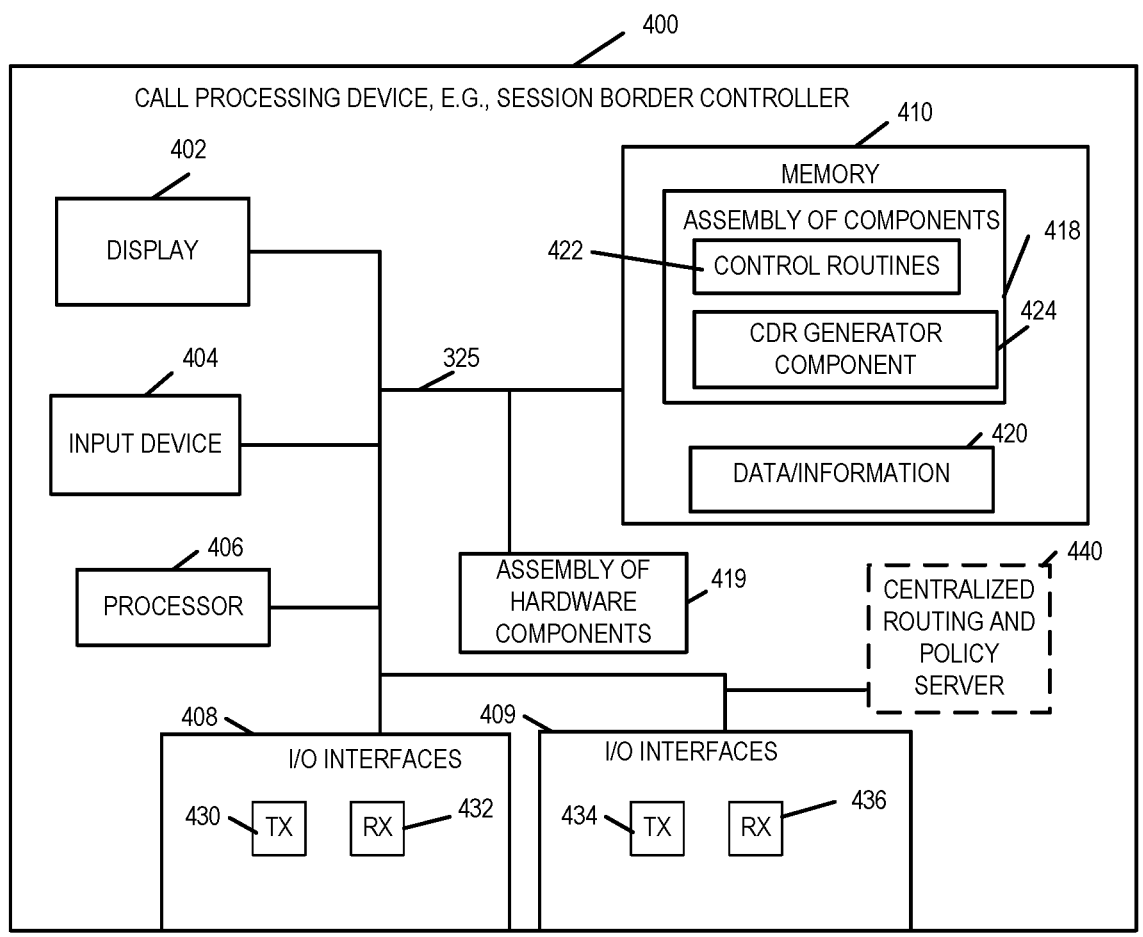
FIG. 4 illustrates an exemplary call processing device, e.g., Session Border Controller, in accordance with an embodiment of the present invention.

FIG. 4 illustrates an exemplary call processing device 400, e.g., Session Border Controller (SBC). For the sake of simplicity, the call processing device 400 is explained using an exemplary embodiment where the call processing device 400 is a Session Border Controller (SBC). However, it should be understood that the invention is not limited to the call processing device of the invention being an SBC. For example, the call processing device 400 can and in some embodiments is a Enterprise telephony system, a Private Branch Exchange, a telephony application server, IP to PSTN gateway or telecommunications/network switching equipment. In some embodiments, the SBC 220 shown in FIG. 2 and calling processing device 308 shown in FIG. 3 are implemented in accordance with call processing device 400. Exemplary call processing device 400 includes an optional display 402, an input device 404, a processor 406, e.g., a CPU, I/O interfaces 408 and 409, which couple the call processing device 400 to networks or communications links and/or various other devices, memory 410, and an assembly of hardware components 419, e.g., circuits corresponding to different components and/or modules, and an optional centralized routing and policy server 440 coupled together via a bus 425 over which the various elements may interchange data and information. In some embodiments, the optional centralized routing and policy server is implemented as a software component or module or a hardware component or a combination of software and hardware components. Memory 410 includes an assembly of components 418, e.g., an assembly of software components, and data/information 420. The assembly of software components 418 includes a control routines component 422 which includes software instructions which when processed and executed by processor 406 control the operation of the call processing device 400 to perform various functions and/or one or more steps of the various method embodiments of the invention. The assembly of components also includes a call detail record generator component 424 which generates call detail records from information corresponding to calls, e.g., VOIP calls, passing through, established by and/or monitored by the Session Border Controller 400. The I/O interface 408 includes transmitters 430 and receivers 432. The I/O interface 409 includes transmitters 434 and receivers 436. The I/O interfaces are hardware interfaces including hardware circuitry. The computing device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP), Session Description Protocol (SDP), Real-time Transport Protocol (RTP), and RTP Control Protocol (RTCP). In some embodiments, the SBC device 400 includes a communication component configured to operate using IP, TCP, UDP, SDP and SIP protocol signaling methods. One or more of the I/O interfaces also support public switched telephone network and Integrated Services Digital Network (ISDN) connections and protocols such as for example, T1/E1 connections, BRI connections, ISDN protocol, etc. In some embodiments, the communications component is a hardware component, a software component or a component including hardware and software components. The centralized routing and policy server is used to generate and distribute routing and other policy to various network entities such as routers, switches, other call processing devices, e.g., SBCs, PBXes, IP to PSTN gateways, telephony application servers, handling calls in the network, e.g., an enterprise network or a telephony service provider network in which the call processing device 400 may be located.

The databases 104, 202, and 217 are implemented on storage devices and/or memory devices. In some embodiments, the databases are implemented on solid state storage devices that support fast access times to minimize delays.

Figure 5:
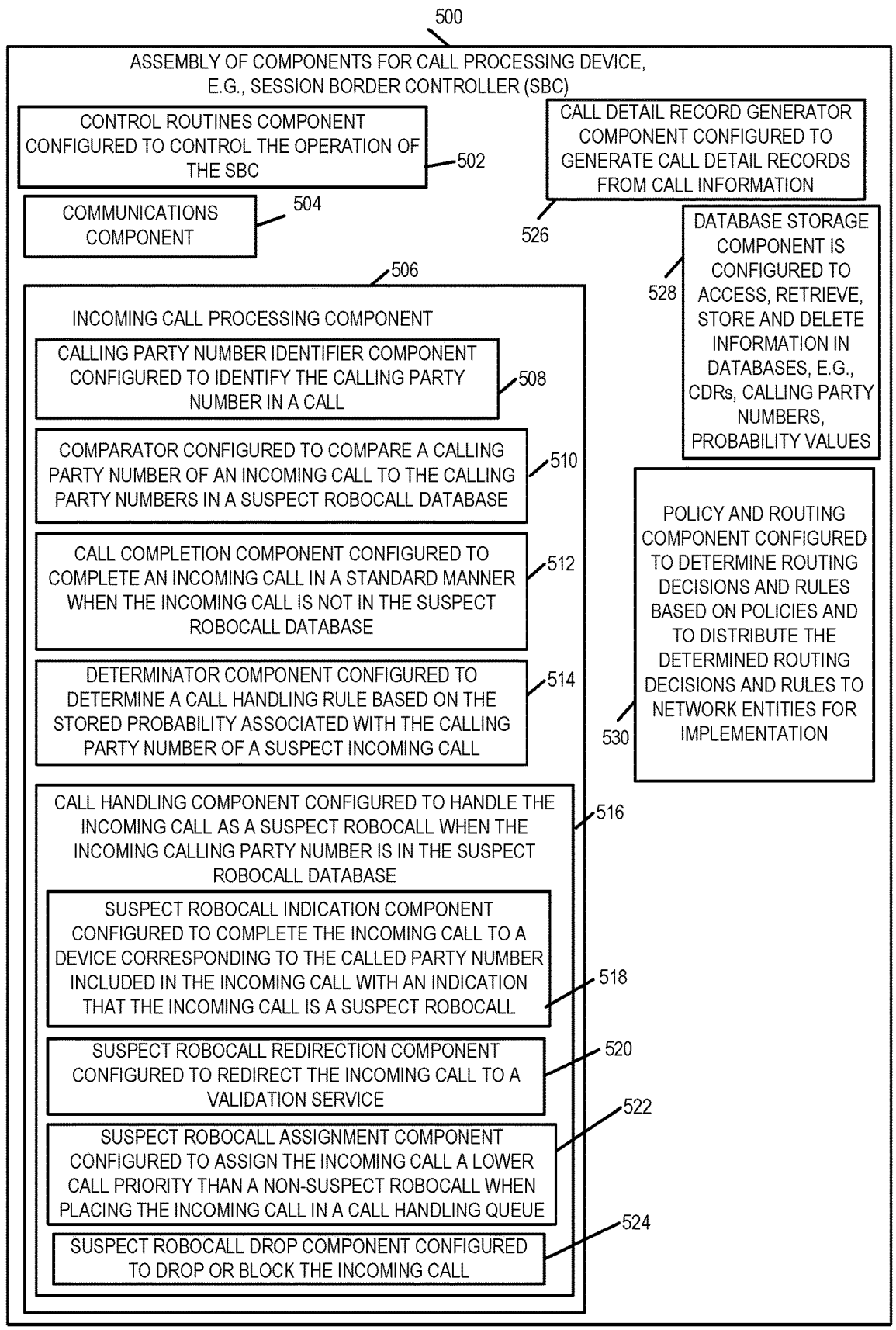
FIG. 5 illustrates an exemplary assembly of components for a call processing device, e.g., a Session Border Controller, in accordance with an embodiment of the present invention.

An exemplary assembly of components 500 for a Session Border Controller in accordance with an embodiment of the present invention is illustrated in FIG. 5. One or more of the assembly of components may be implemented as hardware components in the assembly of hardware components 419 or as software components in the assembly of software components 418 stored in memory 410 of the exemplary SBC 400. The assembly of components 500 will be discussed in further detail below.

Figure 6:
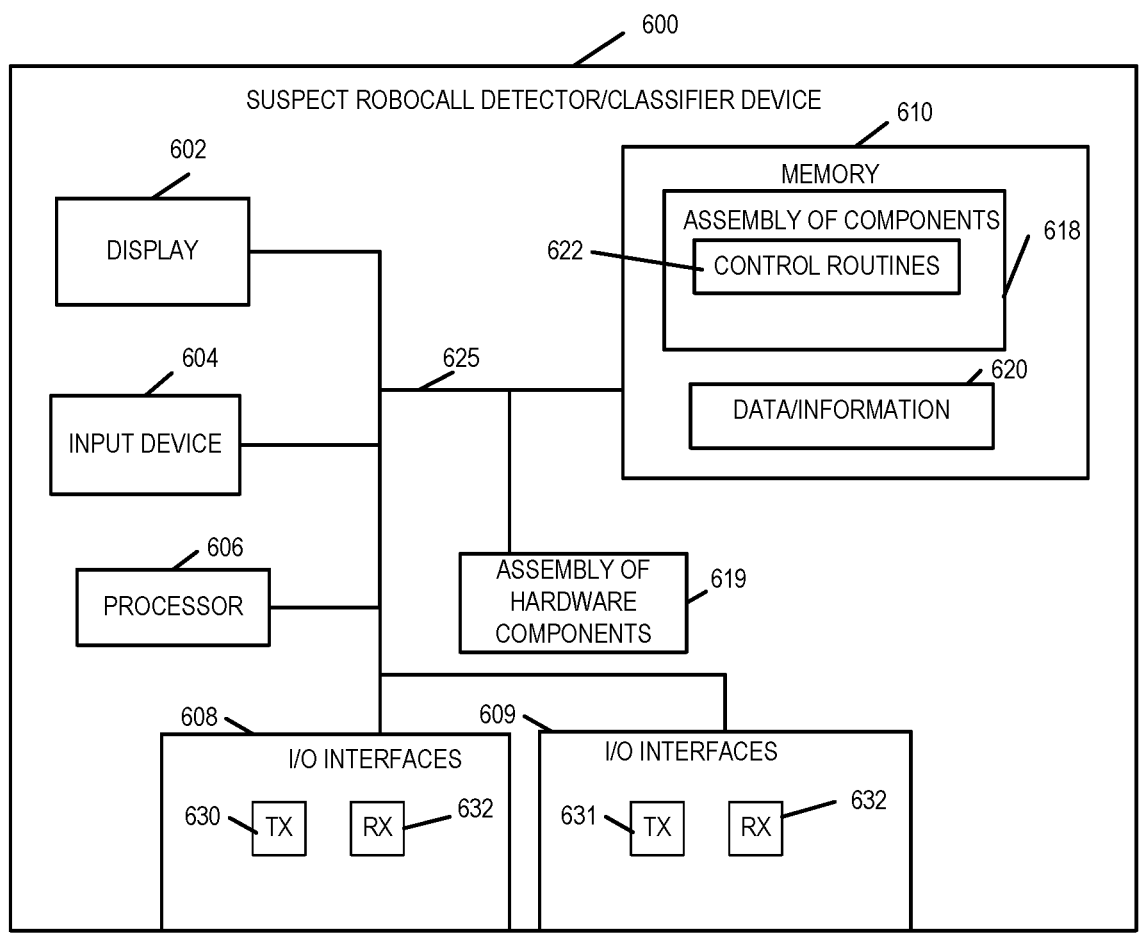
FIG. 6 illustrates a suspect robocall detector/classifier in accordance with an embodiment of the present invention.

FIG. 6 illustrates a suspect robocall detector/classifier 600 in accordance with an embodiment of the present invention.

FIG. 6 illustrates an exemplary suspect robocall detector/classifier device 600. In some embodiments, the suspect robocall detector/classifier devices 310 shown in FIGS. 3 and 1210 shown in FIG. 12 are implemented in accordance with suspect robocall detector/classifier device 600. Exemplary suspect robocall detector 600 includes an optional display 602, an input device 604, a processor 606, e.g., a CPU, I/O interfaces 608 and 609, which couple the suspect robocall detector 600 to networks or communications links and/or various other devices such as SBC 308, labeling database 314, suspect robocall database 312, customer CDRs database 316, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the suspect robocall detector 600 device to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The suspect robocall detector/classifier device 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), SQL (Structured Query Language) Protocol, and HDFS Hadoop Distributed File System Protocol, SQL and/or HDFS being used to interface and access information from the various databases and/or storage devices to which it may be coupled, e.g., the labelling database, suspect robocall database, CDR database. In some embodiments, the suspect robocall detector/classifier device 600 includes a communication component configured to operate using IP, TCP, UDP, SQL (Structured Query Language), HDFS Hadoop Distributed File System. In some embodiments, the communications component is a hardware component, a software component or a component including hardware and software components.

Figure 7:
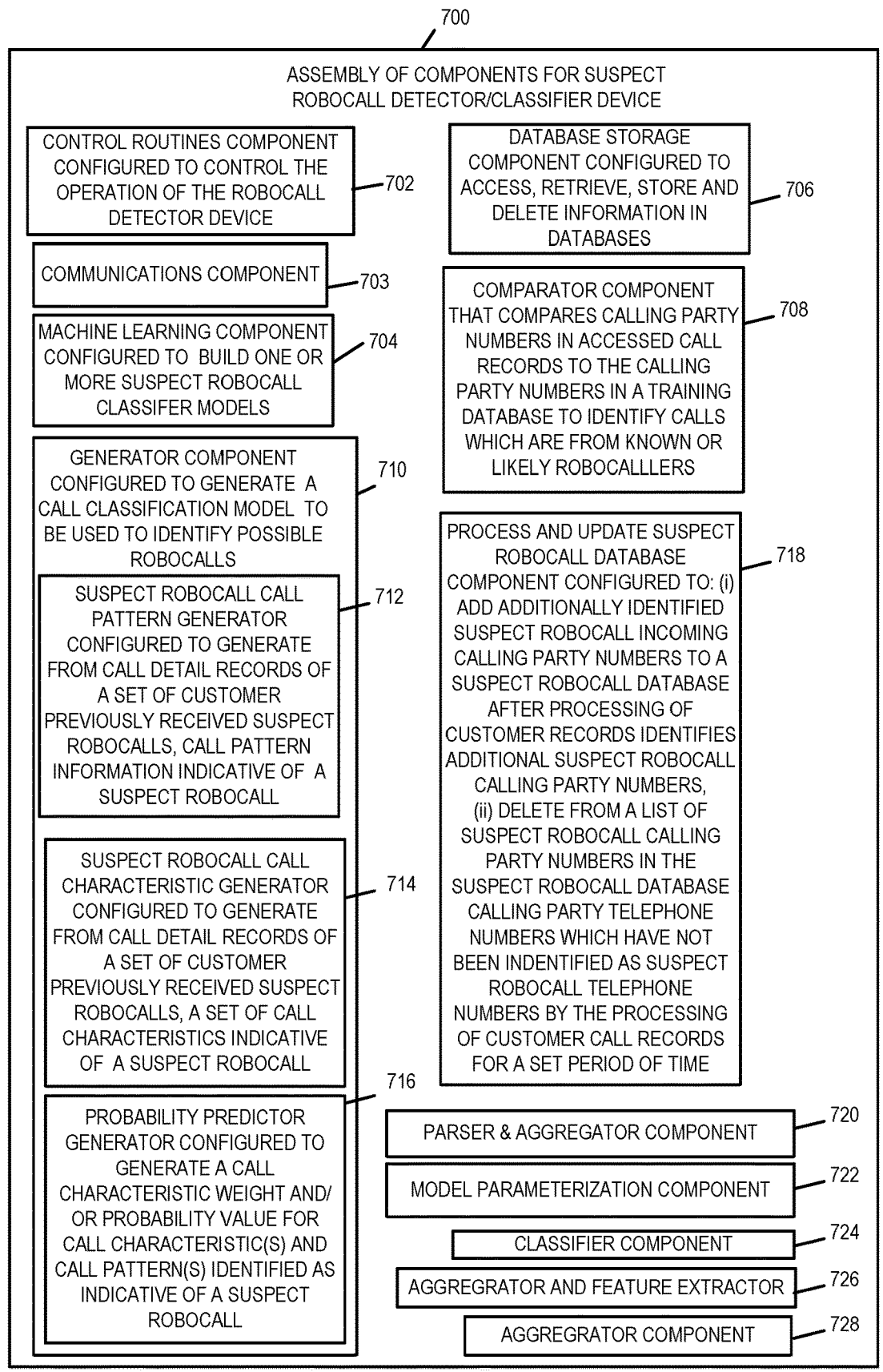
FIG. 7 illustrates an exemplary assembly of components for a suspect robocall detector/classifier in accordance with an embodiment of the present invention.

An exemplary assembly of components 700 for a suspect robocall detector in accordance with an embodiment of the present invention is illustrated in FIG. 7. One or more of the assembly of components 700 may be implemented as hardware components in the assembly of hardware components 619 or as software components in the assembly of software components 618 stored in memory 610 of the exemplary suspect robocall detector 600. The assembly of components 700 will be discussed in further detail below.

Figure 8:
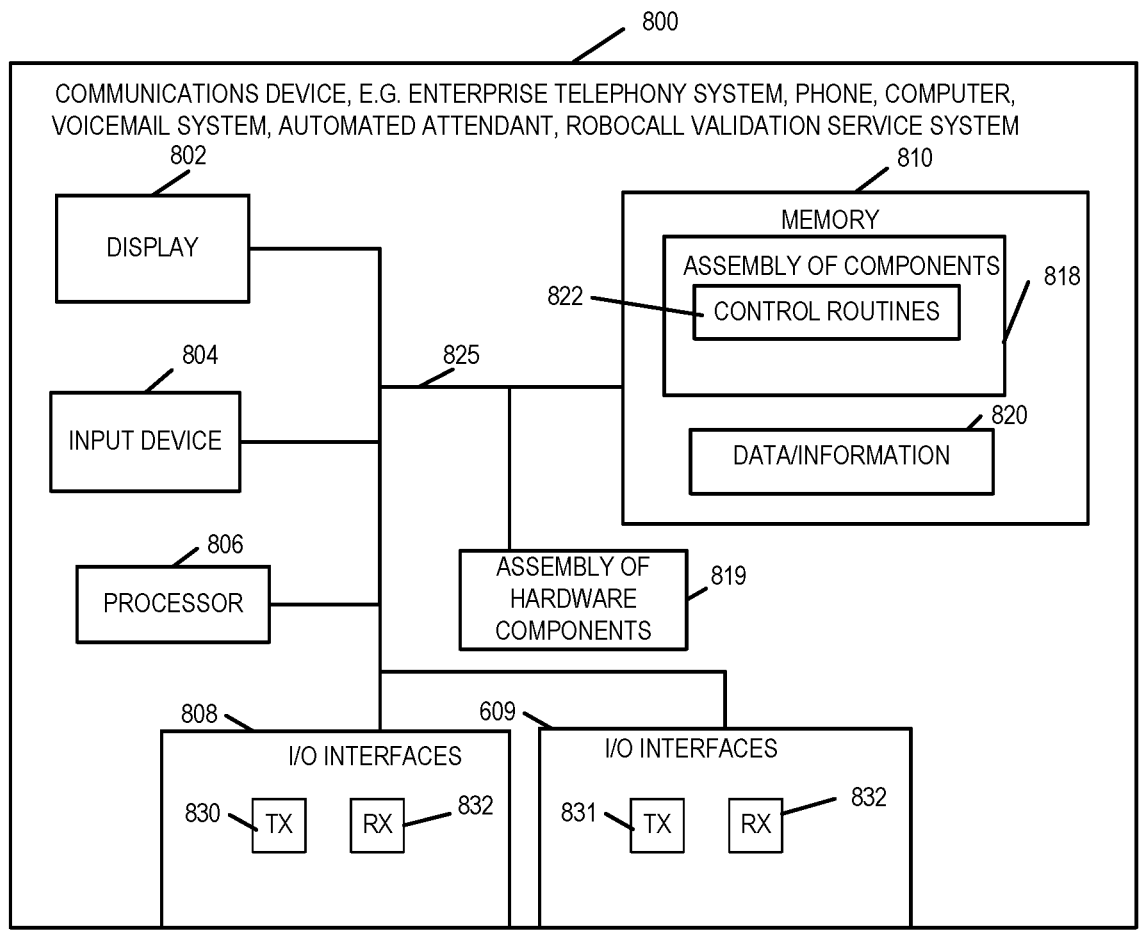
FIG. 8 illustrates an exemplary communications device, e.g., a user endpoint device such as a plain old telephone, a mobile phone, a computer, a laptop, a tablet, smartphone, automated attendant device, voicemail system, enterprise telephony system, a robocall validation service system in accordance with an embodiment of the present invention.

FIG. 8 illustrates an exemplary communications device 800, e.g., a user endpoint device such as a plain old telephone, a mobile phone, a Voice Over Internet Protocol telephone, IP telephone, a computer, a laptop, a tablet, smartphone, automated attendant device, voicemail system, enterprise telephony system, a robocall validation service system. In some embodiments, the following devices and/or systems are implemented in accordance with the exemplary communications device 800: UE 1A 324, UE 1B 326, . . . , UE 1N 328, UE 2A 334, UE 2B 336, . . . , UE 2X 338, UE 3 340, UE 4A 342, UE 4B 344, . . . , UE 4Y 346, UE 5A 348, . . . , UE 5Z 350, UE 12A 1230, . . . , UE 12B 1232, UE 12C 1234, . . . , UE 12D 1236, UE 12E 1238, . . . , UE 12F 1240, UE 12G 1284, . . . , 12 UH 1286, automated attendant 330, voicemail system 332, robocall validation service system 322, and enterprise telephony system 318.

Exemplary communications device 800 includes an optional display 802, an input device 804, a processor 806, e.g., a CPU, I/O interfaces 808 and 809, which couple the communications device 800 to networks (e.g., IMS network 320) or communications links and/or various other devices such as SBC 308, enterprise telephony system 318, automated attendant 330, voicemail system 332, memory 810, and an assembly of hardware components 819, e.g., circuits corresponding to different components and/or modules, coupled together via a bus 825 over which the various elements may interchange data and information. Memory 810 includes an assembly of components 818, e.g., an assembly of software components, and data/information 820. The assembly of software components 618 includes a control routines component 822 which includes software instructions which when processed and executed by processor 806 control the operation of the suspect robocall detector 800 device to perform various functions and/or one or more steps of the various method embodiments of the invention. The I/O interface 808 includes transmitters 830 and receivers 832. The I/O interface 609 includes transmitters 834 and receivers 836. The I/O interfaces are hardware interfaces including hardware circuitry. The computing device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP), Session Description Protocol (SDP), Real-time Transport Protocol (RTP), and RTP Control Protocol (RTCP). In some embodiments, the communications device 800 includes a communication component configured to operate using IP, TCP, UDP, SDP and SIP protocol signaling methods. One or more of the I/O interfaces also support public switched telephone network connections and protocols such as for example ISDN protocol. In some embodiments, the communications component is a hardware component, a software component or a component including hardware and software components.

Figure 9:
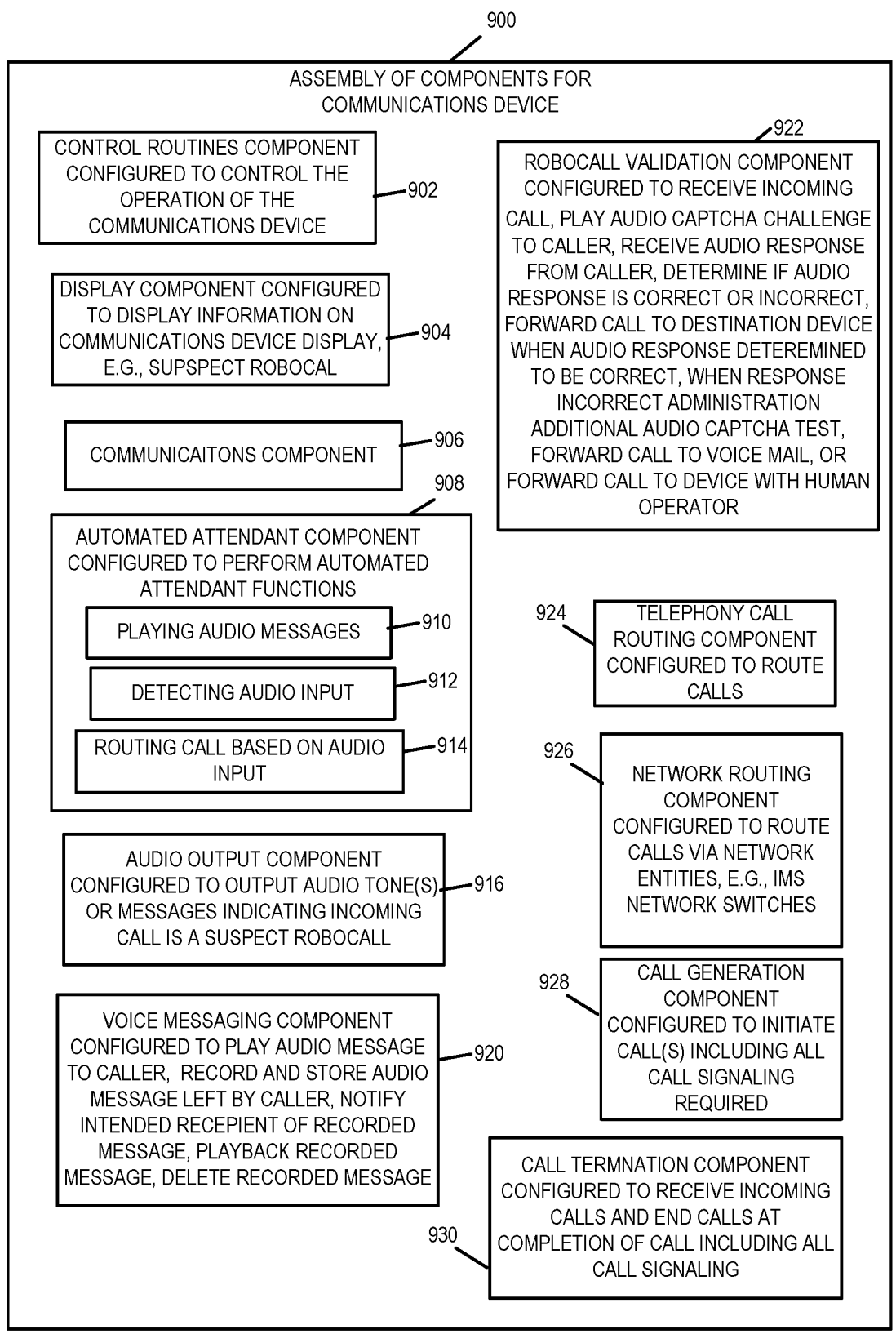
FIG. 9 illustrates an exemplary assembly of components for a communications device in accordance with an embodiment of the present invention.

FIG. 9 illustrates an exemplary assembly of components 900 for a communications device wherein one or more of the components may be, and are used, in implementing one more of the communications devices illustrated in FIGS. 3 and 8 including the enterprise telephony system 318, user endpoint devices 324, 326, 328, 334, 336, 338, 340, 342, 344, 346, 348, 350, automated attendant 330, voicemail system 332, and robocall validation service system 322.

One or more of the assembly of components 900 may be implemented as hardware components in the assembly of hardware components 819 or as software components in the assembly of software components 818 stored in memory 810 of the exemplary communications device 800. The assembly of components 900 will be discussed in further detail below.

Figure 10B:
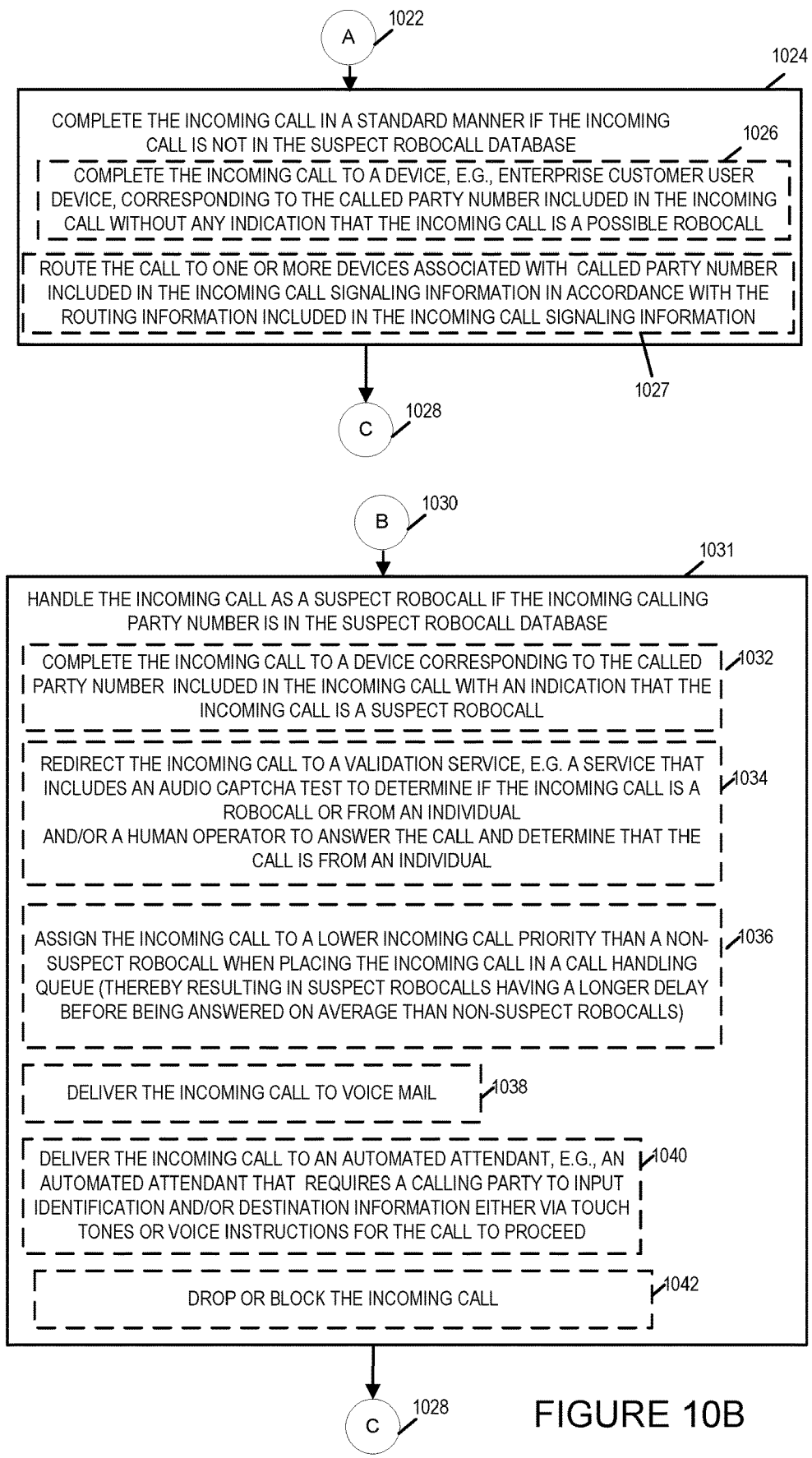
FIG. 10B illustrates a second part of a flowchart of an exemplary method in accordance with an embodiment of the present invention.

FIG. 10 comprises the combination of FIGS. 10A and 10B. FIG. 10A illustrates a first part of a flowchart of an exemplary method in accordance with an embodiment of the present invention. FIG. 10B illustrates a second part of a flowchart of an exemplary method in accordance with an embodiment of the present invention. The steps of method 1000 illustrated in FIG. 10 may be, and in some embodiments are, implemented on devices illustrated in the systems of FIGS. 1, 2, and/or 3. The exemplary method 1000 will now be explained in connection with exemplary system 300 though it should be understood that system 300 is only be used for explanatory purposes and that the method 1000 may be implemented on other devices and in other systems.

The method 1000 begins at start step 1002 shown on FIG. 10A. At the start of the system the suspect robocall database is empty. Operation proceeds from start step 1002 to step 1004.

Figure 11:
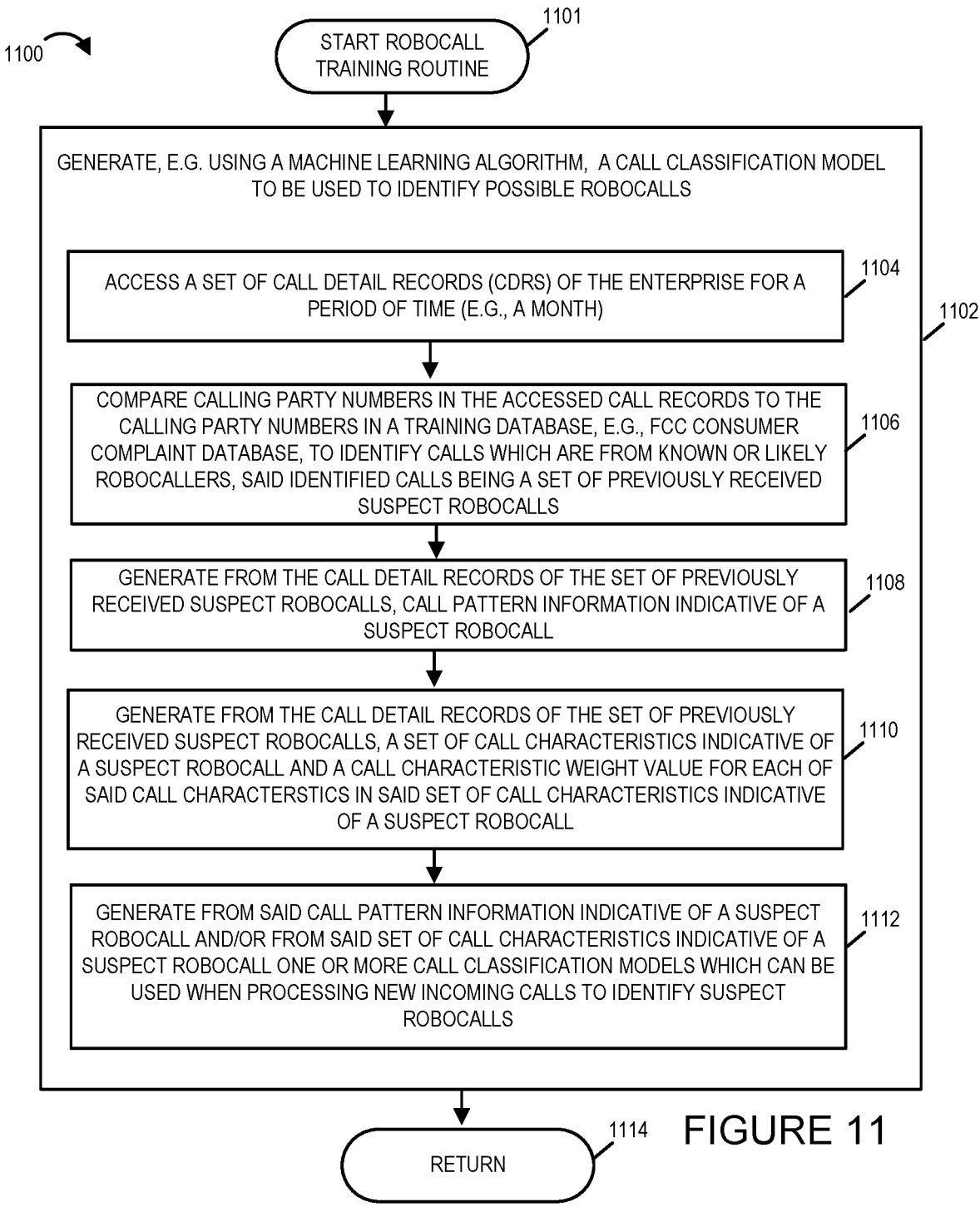
FIG. 11 illustrates a flow chart of an exemplary robocall training routine method in accordance with an embodiment of the present invention.

In step 1004 a robocall training routine or subroutine is called. An exemplary robocall training routing method 1100 is illustrated in FIG. 11 and explained in greater detail below. The robocall training routine generates one or more call classification models to be used to identify possible robocalls. The robocall training routine is implemented by one or more processors or components of the robocall detector which accesses historical customer call detail records, e.g., one or more months worth of customer call detail records generated by the SBC 308 and stored in the customer CDRs database 316 and compares information in the call detail records to calling party numbers in a labeling database 314, e.g., FCC customer complaint database which includes reported telephone numbers of robocallers. The robocall detector uses a machine learning algorithm to generate a call classification model that is to be used identify future incoming suspect robocalls. Once the call classification model is generated it can be used in the process of detecting and handling suspect robocalls for example by introducing call handling routines and policies into the network that affect the routing and disposition of suspect robocalls. Once the robocall training routine has been completed and the suspect robocall classification model generated, operation proceeds from step 1004 to step 1006.

In step 1006, the suspect robocall detector 310 receives call detail records of a customer, e.g., an enterprise customer. The call detail records are typically for incoming calls to the customer over a period of time such as 15 minutes or an hour and in the exemplary embodiment are generated by the SBC 308 and sent to the suspect robocall detector 310 or stored in the CDRs database 316 from which the suspect robocall detector device can obtain them on a periodic basis. In some embodiments, the SBC sends the robocall detector the CDRs either after a set period of time which may be configurable has been passed or after the SBC has generated a particular predetermined number of CDRs. Operation proceeds from step 1006 to step 1008.

In step 1008, the call records of the customer are processed by the suspect robocall detector to identify calls which are possibly from a robocaller, based on at least one of i) a call characteristic (e.g., a media characteristic for the call such as jitter, latency, round trip time, or a Session Initiation Protocol (SIP) characteristic of the call such as order of SIP headers and/or parameters in a SIP INVITE message corresponding to a call, formatting of the SIP headers and/or their values, and/or SIP message body formatting and SIP message body content, e.g., content of a SDP Offer message included in a SIP INVITE message or the SDP Offer message's format), or a call pattern. The call pattern includes at least one of an error rate, call rate, call diversity or start-to start time between adjacent calls from a call source (e.g., a network or enterprise, e.g., a VOIP network) from which multiple calls are received, each of the identified calls having a calling party number. The robocaller detector uses the generated one or more suspect robocall classification models to identify the robocalls. In some embodiments, call records with incoming calling party numbers matching a calling party number already stored in the suspect robocall database are not processed as the characteristics of the call will have been altered by the call handling actions taken in view of the incoming calling party number having already been identified as a suspect robocall. Such numbers will be removed from the suspect database after a set fixed period of time, e.g., a week. In some other embodiments, the calling party numbers matching numbers already in the suspect database will be processed to determine whether their probability of being an actual robocall has increased as discussed below. Operation proceeds from step 1008 to step 1010.

In step 1010, the suspect robocall detector stores the calling party numbers of the identified calls in the suspect robocall database 312, e.g., storing a list of the calling party numbers of the identified calls in a local suspect robocall database located at the enterprise customer site 302. Operation proceeds from step 1010 to optional step 1012 if implemented otherwise operation proceeds from step 1010 to step 1016.

In optional step 1012, the suspect robocall detector device 310 stores with the individual calling party numbers of the identified calls in the suspect robocall database 312 a probability that the individual called party number corresponds to an actual robocall. In some embodiments optional step 1012 is performed concurrently with step 1010.

In some embodiments, the identified numbers are group together into a plurality of sets with the grouping being by a range of probabilities instead of or in addition to the individual probabilities for each identified calling party number being stored with the identified calling number. For example, there might be three sets of groupings to which identified calling party numbers are assigned a low probability set, a medium probability set and a high probability set. The first low probability set including identified calling party numbers having a calculated probability of between 30% and 49% of being an actual robocall. The second medium probability set including identified individual calling party numbers with a probability of between 50% and 75% of being an actual robocall. And, the third high probability set including identified individual calling party numbers with a probability of between 76% and 100% of being an actual robocall. In some such embodiments, the suspect robocall database may bypass storing the set or a portion of the set of low probability identified suspect robocall calling party numbers in the suspect robocall database, e.g., identified calling party numbers with a probability below a certain probability threshold e.g., 40% or less. In this example it assumes that no calling party numbers are identified if they have a probability of less than 30% of being an actual robocall. In most but not all embodiments, only calling party numbers with a probability greater than 50% that the call is an actual robocall are identified as suspect robocalls.

Operation proceeds from step 1010 or optional sub-step 1012 to step 1016.

In step 1016, the SBC 308 receives an incoming call with a destination being one of the communications devices in the enterprise network 302. The incoming call may be for example a VOIP call received on one of the receivers of the SBC 308's I/O interfaces. Operation proceeds from step 1016 to step 1018.

In step 1018, the SBC 308 processes the received incoming call. The processing includes comparing a calling party number of the incoming call to the calling party numbers in the suspect robocall database. As shown in sub-step 1020 if the incoming calling party number does match a calling party number in the suspect robocall database then operation proceeds from sub-step 1020 of step 1018 via connection node B 1030 to step 1031 illustrated on FIG. 10B. If the incoming calling party number does not match a calling party number in the suspect robocall database then operation proceeds from sub-step 1020 of step 1018 via connection node A 1022 to step 1024 shown on FIG. 10B.

In step 1024, the incoming call whose incoming calling party number is not in the suspect robocall database is completed in a standard manner. Step 1024 may include one or more of the optional sub-steps 1026 and 1027.

In optional sub-step 1026, the incoming call is completed to a device, e.g., an enterprise customer user device, e.g., UE 3 340, corresponding to the called party number included in the incoming call without any indication that the incoming call is a possible robocall.

In optional sub-step 1027, the incoming call is routed to one or more devices associated with the called party number included in the incoming call signaling information in accordance with the routing information included in the incoming call signaling information.

Step 1024 and its optional sub-steps may be implemented by SBC 308 and in some embodiments one or more network devices in the enterprise network, for example routers in IMS network 320 if the called party number corresponds to one or more of the communications devices UE 2A 334, UE 2B 336, . . . , UE 2X 338 or the enterprise telephony system 318 if the called party number corresponds to one of the communications devices coupled to the enterprise telephony system 318.

Operation proceeds from step 1024 via connection node C 1028 to step 1016 wherein another an incoming call is received at the Session Border Controller. While in the flow chart only one call is handled at a time it is to be understand that multiple calls may be handled concurrently.

Returning now to the situation in which the comparing in step 1018 resulted in the incoming calling party number of the received call matching a calling party number in the suspect robocall database, the operation proceeds from step 1018 to step 1031. In step 1031, the incoming call is handled as a suspect robocall by the SBC 308. In some embodiments, step 1031 includes one or more optional sub-steps 1032, 1034, 1036, 1038, 1040, and 1042.

In sub-step 1032, the incoming call is completed to a device corresponding to the called party number included in the incoming call with an indication that the incoming call is a suspect robocall. Exemplary indications will now be described. It should be noted that the indication may be, and in some embodiments is, a combination of one or more of the following described exemplary indications. The indication in some embodiments is a display message indicating that the incoming call is a suspect robocall. The display information may be for example inserted in to the calling line identification signaling information of the call. The display of the user device may for example display "SUSPECT ROBOCALL". In some embodiments, the indication may be an audio indication such as a specific ringtone, specific ring pattern or a specific tone prior to ringing identifying the call as suspect robocall. For example, the communications device may have three beeps precede ringing. In some embodiments, the audio indication might be a spoken phrase alerting the intended recipient of the call that the call is a suspected robocall. The communications device may play the following audio "INCOMING CALL IS A SUSPECTED ROBOCALL." prior to providing an alerting notification, e.g., ringing the communications device. The indication could be the color of a flashing LED associated with the call on the communications device, e.g., yellow LED flashing instead of green when an incoming call is a suspected robocall. This allows notification when the communications device is receiving multiple incoming calls as to the priority of which calls the user may wish to answer first. The indication may be a different icon presented on the communications device display for suspect robocalls.

In sub-step 1034, the SBC redirects the incoming call to a validation service, e.g., a service that includes an audio CAPTCHA (Completely Automated Public Turing test with audio challenge and a response to tell Computers and Humans Apart") to determine if the incoming call is a robocall or from an individual, e.g., robocall validation service system 322. In some embodiments, the validation service may be a human operator to answer the call and determine/validate that the call is from a human individual and is not a robocall and then direct the call to its proper destination. If the call is determined not to be robocall the incoming calling party number may be, and in some embodiments is, entered on a white list of incoming calling party numbers that is inputted to the suspect robocall detector 310 so that the number is removed from the suspect robocall database for future incoming calls.

In sub-step 1036, the SBC 308 assigns the incoming call to a lower incoming call priority than a non-suspect robocall when placing the incoming call in a call handling queue thereby resulting in the suspect robocalls having a longer delay before being answered on average than non-suspect robocalls.

In sub-step 1038, the SBC 308 delivers the incoming call to a voice mail system for example by redirecting the call to a voice mail box of a voice mail system, e.g., voicemail box associated with the called party number of the incoming call or changing the routing information of the call so that it is redirected to voice mail system.

In sub-step 1040, the SBC 308 delivers the incoming call or changes the routing of the incoming call, e.g., signaling routing information of the incoming call, so that it is delivered to an automated attendant device or system, e.g., automated attendant 330, that requires a calling party to input identification and/or destination information either via touch tone inputs or voice instructions for the call to proceed.

In sub-step 1042, the SBC 308 drops or blocks the incoming call.

Operation proceeds from step 1031 via connection node C 1028 to step 1016 wherein another an incoming call is received at the Session Border Controller. As previously mentioned, while in the flow chart only one call is handled at a time it is to be understand that multiple calls may be handled concurrently.

In some embodiments, the processing of incoming calls in step 1008 further includes a sub-step of determining, based on the stored probability associated with the calling party number of a suspect incoming call, a call handling rule. The handling of the call as suspect robocall may, and in some embodiments does, include determining what action to take based on the probability that the incoming call is a robocall. For example, in some embodiments, a higher probability that an incoming call is a robocall causes a lower call handling priority to be assigned than is assigned when an incoming call has a lower probability of being a robocall.

In some embodiments such as the exemplary embodiment described in FIG. 3, the customer is an enterprise customer. In some embodiments, a telephony service provider performs the steps of the method 1000 as a service for a customer, e.g., an enterprise customer.

In some embodiments such as the exemplary embodiment described in FIG. 12, the customer is considered to be the telephony service provider with the call detail records received in step 1006 being the combined detail records from the call processing devices 1204, 1206, ..., 1208.

In some embodiments, the step of processing call records of said customer is performed on a periodic basis for calls to the customer, e.g., enterprise customer. The customer can in some such embodiments control the periodic basis of the processing of call records to control the periodicity at which the database of suspect robocall calling party numbers is updated. Exemplary periodicity setting for updating the suspect robocall database are 15 minutes, 1 hour, and 24 hours. The updating the database can and sometimes does include deleting from the list of suspect robocall calling party telephone numbers which have not been identified as suspect robocall telephone numbers by the processing of said customer call records for a set period of time (e.g., remove numbers which have not been determined to be suspect for a day.) This is typically done when the calling handling actions do not significantly impact the call classification model, e.g., when the call handling action is to provide an indication that the call is a suspect robocall.

In most but not all embodiments, the processing of call records of said customer to identify calls which are possibly from a robocaller is performed by a device external to a session border controller which routes calls to the customer, e.g., enterprise customer. This is how it is illustrated in the exemplary system 300. The exemplary system 300 shows the suspect robocall detector device 310 as a separate and distinct device from the Session Border Controller 308. The separation of the SBC from the robocall detector provides a more efficient system as the SBC is not burdened with the additional processing requirements for the robocall detector.

In some embodiments, the robocall detector is implemented as a cloud service wherein the robocall detector is implemented as an application on a compute node located in the cloud to which the customer subscribes.

In some embodiments, the comparing a calling party number of an incoming call to the calling party numbers in the suspect robocall database is performed by the session border controller for all calls directed to phone numbers corresponding to the enterprise. For example, when the session border controller provides services to multiple enterprise customers, the session border controller performs the comparison step discussed for only the enterprise customer who subscribed to the service and only for those incoming calls with calling party numbers for the subscribing enterprise customer.

In some embodiments, a PSX device which is external to the SBC 308 performs the call processing steps of the method 1000. In some such embodiments, the SBC 308 still generates and stores call detail records for calls routed through the SBC to the CDR database 316.

In most but not all embodiments, the suspect robocall database is a locally maintained database at a site of the enterprise customer as shown in the exemplary system 300 of FIG. 3. The suspect robocall database however can be located a variety of different locations in the system. Similarly, the suspect robocall detector/classifier device while illustrated as located on the customer premises it also be located at a variety of locations in the system including outside of the customer premises. Many customers may wish to avoids providing the customer's call detail records to third parties for processing for reasons of security and privacy. Locating the CDRs database 316, suspect robocall database 312 and suspect robocall detector/classifier device 310 within the customer premises provides the advantage of allowing the customer to maintain possession and control of the customer's call detail records. This allows the customer to control access to and security of the CDRs and the information contained therein which at least in some instances is a requirement of the customer (e.g., to protect privacy and confidentiality of individual information and business information contained therein or derived therefrom such as client contact information) and which can also be required by privacy regulations and/or laws. Locating the CDRs database 316, suspect robocall database 312 and suspect robocall detector/classifier device 310 on the customer premises reduces the risk of unintended or improper access to or disclosure of the information disclosed in the customer CDRs.

The suspect robocall database typically includes fewer records than the labeling database of reported possible robocalls used to identify characteristics of robocalls. For example, the suspect robocall database will have significantly less records than the FCC customer complaint database which may include hundreds of thousands or millions of records used for labeling. As the calling party number of each incoming call needs to be checked against the suspect robocall database, the fewer records allow much faster look up times in the suspect robocall database than if the FCC database was used, providing better load performance and overall enhanced performance for the system and in turn the customers.

In the prior art approaches where the FCC customer complaint database or a third party database is used each incoming call must be checked against all records in the database with the number of records being exceedingly large. In such approaches if the calling party number is in the database the call is blocked or terminated. One of the problems with this approach is that the call processing cost (i.e., checking of each record in the database) becomes a function of the total number of records in the database rather than the total number of active robocall sources.

The new architecture and approach of using an adjunct processing device, e.g., robocall detector, to identify a particular number of active robocalls at a specific time results in a suspect robocall database for a particular enterprise customer that has a greatly reduced number of records as opposed to the other FCC customer complaint database and other third party databases. By focusing on the active suspect robocalls, the invention is far more efficient than these prior systems. While the enterprise customer will receive some suspect robocalls before the system identifies as a suspect robocall the incoming calling party number, the advantage of maintaining a small number of active suspect robocall numbers and therefore increased processing efficiency is a distinct and important advantage. With the suspect database being updated for example every 15 minutes or every hour the database of active suspect robocalls can be kept quite small in comparison to a database that merely adds every potential robocall number. Furthermore, as the robocall detector identifies or classifies incoming calls as suspected robocalls based on call characteristic(s) and call pattern(s), robocallers that spoof valid incoming calling party numbers will be identified as suspect robocalls. Moreover, the suspect robocall detector will be able identify suspect robocalls which have not yet been reported and included in the FCC consumer complaint database or third party database as the suspect robocall detector identifies suspect robocalls based on call characteristic(s) and call pattern(s). Many robocallers are also spammers from outside the United States and whose numbers are not in the U.S. FCC customer complaint database. Nevertheless, the characteristic(s) and call pattern(s) will be the same or similar to the U.S. robocall numbers on which the suspect robocall classification model is built and therefore the robocall detector will be able to identify these foreign robocalls even if the numbers are not in the FCC customer complaint database.

The architecture of the system embodiments wherein the robocall detector does not perform its suspect robocall detection in real time on all incoming calls but instead performs the suspect robocall detection on previously received calls on a periodic basis allows provides the advantage that the robocall detector does not have to handle all incoming calls and therefore does not have to be scalable as the incoming call load increases. That is the robocall detector does not have to have the capability to handle an increasing load of incoming calls in real time as the number of calls increase. The robocall detector receives call records for previously received calls at periodic intervals and therefore does not need additional interfaces and resources to handle increased call loads. The separation from the SBC call handling and the robocall detector's detection of incoming calling party numbers as suspected robocalls provides the advantage that the robocall detector can be cheaper and require less resources as it does not have to be able to scale up to handle call loads and therefore does not need as many interfaces and calling handling capabilities.

In various embodiments of the invention, the robocall detection and policy portion of this system are an "overlay" onto the call processing network/system. This architecture provides the advantage that it allows the system to scale independently of the call processing. So the system can made more accurate by adding resources, e.g., processing resources, to the robocall detection portion (which will produce more accurate call characteristics and call patterns to check against) without affecting the call processing resources; similarly, the incoming call processing aspects of the system can be changed without needing to touch the detector portion of the system. This isolation of the robocall detection processing from the incoming call processing is an advantage over known existing implementations that are not isolated and require scaling of both incoming call processing capability and robocall detection capability at the same time because of the lack of isolation of these different aspects of the overall system.

FIG. 11 illustrates a flow chart 1100 of the exemplary robocall training routine method 1004 illustrated in FIG. 10A.

The routine 1100 starts in start robocall training routine step 1101 from which operation proceeds to step 1102.

In step 1102, the suspect robocall detector device 310 generates a call classification model to be used to identify possible robocalls. The call classification model may be, and typically is, generated through use of a machine learning algorithm. In some embodiments, a machine learning framework that uses stochastic gradient descent algorithm or the Broyden-Fletcher-Goldfarb-Shanno (BFGS) algorithm is used in generating the call classification model. In some embodiments, the call classification model is regularized for example using L1 or L2 normalization. L2 normalization is least squares normalization.

In some embodiments, step 1102 includes one or more sub-steps 1104, 1106, 1108, 1110, 1112, and 1114.

In sub-step 1104, the suspect robocall detector device 310 accesses in the customer CDR database 316 a set of customer call detail records (CDRs) of the enterprise for a period of time such as for example one or two months worth of call detail records. Operation proceeds from sub-step 1104 to sub-step 1106.

In sub-step 1106, the suspect robocall detector device 310 compares calling party numbers in the accessed call records to the calling party numbers in a labeling database (e.g., labeling database 314) to identify calls which are from known or likely robocallers, the identified calls being a set of previously received suspect robocalls. In some embodiments, the labeling database is or is a copy of the FCC consumer complaint database. In some embodiments, the suspect robocall detector device 310 includes a hardware comparator that performs this sub-step. Operation proceeds from sub-step 1106 to sub-step 1108.

In sub-step 1108, the suspect robocall detector device 310 generates from the call detail records of the set of previously received suspect robocalls, call pattern information indicative of a suspect robocall. Operation proceeds from sub-step 1108 to sub-step 1110.

In sub-step 1110, the suspect robocall detector device 310 generates from the call detail records of the set of previously received suspect robocalls, a set of call characteristics indicative of a suspect robocall and a call characteristic weight value for each of said call characteristics in said set of call characteristics indicative of a suspect robocall. In most embodiments, the set of call characteristics indicative of a suspect robocall include of a plurality of characteristics. In some embodiments, the set of call characteristics include hundreds of characteristics with non-zero weight values. Operation proceeds from sub-step 1110 to sub-step 1112.

In sub-step 1112, the suspect robocall detector device 310 generates from the call pattern information indicative of a suspect robocall and/or from said set of call characteristics indicative of a suspect robocall one or more call classification models which can be used when processing new incoming calls to identify suspect robocalls. Operation proceeds from step 1110 to return step 1114 wherein the routine completes and returns to routine that invoked the start robocall training routine for example method/routine 1000.

As previously discussed above and in connection with the methods 1000 and 1100, the calling party source identification information illustrated is the calling party number. However, additional calling party source identification information associated with a call may be, and in some embodiments is, used to detect suspect robocalls. In another embodiment which will now be described, multiple calling party identifiers corresponding to a call are used in identifying suspected robocalls and taking actions to mitigate or eliminate the disruptions to customers and/or networks caused by the identified suspect robocalls.

There are various fields in a call detail record, e.g., an SBC call detail record, that may be used in determining the probability that a call is a robocall, e.g., a suspect robocall, and are also calling party source identifiers that are also available in initial SIP INVITE requests. Some particularly pertinent exemplary fields include calling party source identification information S1 to S7 listed below:

S1. Calling party user information from the From header (i.e., the calling party number);

S2. Calling party user information from the P-Asserted-ID header (which is added by network and therefore slightly more reliable or trustworthy than the calling party user information from the From header);

S3. Originating telephone number from the Identity header (part of the STIR-SHAKEN (Secure Telephone Identity Revisited—Signature-based Handling of Asserted information using toKENs) framework currently under development by Internet Engineering Task Force (IETF) in which digital certificates, based on common public key cryptography techniques, are used to ensure the calling number of a telephone call is secure;

S4. Ingress peer signaling address;

S5. Ingress peer address from the Contact header;

S6. Ingress peer address from the first (closest to originator) Via header; and

S7. Digest of the SIP user agent string.

Calling party source identification information S1 to S7 all have characteristics that they are obtainable from the CDRs and are also easily available to extract during call processing from an initial SIP INVITE request message so that incoming calls can be identified as suspected robocalls. Exemplary CDRs include information from call initiation requests that include source identifiers such as for example the SIP VIA header, SIP agent string, SIP Contact Header, and SIP Ingress Signaling Peer.

Referring back to FIG. 1, the labeling database 104 includes source identification information for the source calling party identifiers S1 to S7 described above. Such a labeling database can be generated from information contained in CDRs of calls identified by customers as being robocalls. The raw call detail records 102 are compared to the records maintained in the labeling database 104 to create labeled CDRs 108. The labeled CDRs 108 are generated by comparing each of the S1 to S7 source identifiers contained in the raw CDRs 102 to the S1 to S7 source identifier contained in the labeling database of previously identified robocalls and when any of the S1 to S7 source identifiers in a raw CDR matches a S1 to S7 source identifier in the labeling database dataset, labeling that raw CDR as a robocall CDR. The labeled CDRs 108 now contain a dataset with CDRs that label whether the CDR corresponds to a robocall or corresponds to a call that has not been previously identified as a robocall based on the S1 to S7 source identifiers.

In another embodiment, the labeling database is a database that includes calling party telephone numbers of previously reported robocalls, e.g., FCC consumer complaint database, but doesn't contain all of the calling party source identifiers discussed for S1 to S7. In such an instance a first pass is made wherein the raw CDRs S1 field is compared to the calling party telephone numbers in the labeling database and when a match occurs the CDR is labeled as a robocall CDR. The calling party source identification information S2 to S7 from the identified and labeled robocall CDRs is then used as matching criteria for identifying robocalls in the raw CDRs in subsequent passes through the raw CDR database and when a match occurs the CDR is labeled as robocall CDR. The labeled CDRs 108 now contain a dataset with CDRs that label whether the CDR corresponds to a robocall or corresponds to a call that has not been previously identified as a robocall in connection with each of S1 to S7 source identifiers based on the calling party numbers included in the labeling database of known robocallers and correlated to S1 to S7 source identifiers included in the CDRs.

The labeled call detail records 108 outputted by the combiner 106 are then further processed by a parser and aggregator 110 wherein the labeled call detail records are adorned with aggregated features, i.e. a set of features determined by grouping like or similar call detail records together. The combiner 112 outputs the call detail records with the labels and features 114 which is input to a model parameterization process or routine 116 that generates the classification model 118 from the exploded feature set, the classification model being a model that classifies a call detail record and corresponding call as a suspect robocall and the predicted probability that the call is a robocall. In this case as there are S1 to S7 different calling party source identifiers, the classification model classifies each of the S1 to S7 calling party source identifiers with a probability that the S1 to S7 source identifier corresponds to a robocall.

The execution system used when there are multiple calling party source identifiers, e.g., calling party source identifiers S1 to S7, is similar to the execution system 200 but uses the classification model discussed above which generates different probabilities for different calling party source identifiers.

A discussion of how system 200 with certain modifications can be used when there are multiple calling party source identifiers is now explained. The system 200 starts with an empty suspect calling number database 217. As calls 201 arrive into the network at the session border controller 220, session border controller 220 generates call detail records and stores them in storage device 202, e.g., CDR database 202. The raw CDRs 204 include calling party source identification information, i.e., one or more of the calling party source identifiers S1 to S7. In some embodiments, the SBC stores the CDRs in its own memory instead of or in conjunction with storage of the generated CDRs in storage device 202. At periodic intervals, the system 200 featurizes the call detail records 204 with both in-record features and aggregated features. This is shown by the raw CDRs 204 which have been generated by the session border controller 220 when they are combined and the aggregator & feature extractor 206 processes the CDRs so that the combiner 208 outputs the CDRs with features 210. Each of the featurized CDRs over the last interval is then run through the classification model to generate a predicted robocall probability for each calling party source identifier S1 to S7, and for each calling party source identifier S1 to S7, the predicted probabilities are combined and checked against a threshold. This is illustrated in FIG. 2 where the CDRs with features 210 is input to classifier process/routine 212 which generates a predicted robocall probability for each of the calling party source identifiers S1 to S7 using the classification model 118 and outputs the calling party source identifiers S1 to S7 with a robocall generated probability 216 to aggregator 218. The aggregator 218 checks the robocall S1 to S7 calling party source identifiers predicted probability against a threshold and calling party source identifiers with predicted probabilities exceeding the threshold are then added to the suspect database 217. The aggregator also determines a severity level of the suspect calling party source identifier S1 to S7 and reports or sends it to a session border controller 220 which includes a centralized policy and routing server (PSX 221) or which communicates with an external centralized policy and routing server, e.g., Sonus PSX 222, which pushes/sends policies into the network to affect new calls to minimize, address and/or eliminate the disruption of suspect calling numbers corresponding to suspect robocalls.

When a new call, e.g., an initial SIP INVITE request, arrives at a call processing device, such as a SBC with a policy and exchange server, the SBC extracts the value for each of the fields S1, S2, S3, S4, S5, S6, and S7 from the SIP INVITE request, i.e., it extracts the S1 to S7 calling party source identifiers for the SIP INVITE request, queries the suspect robocall database for each of the extracted S1 to S7 calling party source identifiers and obtains a probability that each one of the extracted S1 to S7 calling party source identifiers for the new call is a robocall, and then generates an overall probability that the new call, e.g., SIP INVITE request, is a robocall from the individual probabilities obtained from the suspect robocall database for each the S1 to S7. It will be understood that if no matching entry for an S1 to S7 calling party source identifier is found in the suspect robocall database then a probability of 0 is used for that calling party source identifier. The overall probability may be, and in some embodiments is, generated by computing the sigmoid function of the weighted individual obtained probabilities for the S1 to S7 source identifiers extracted from the call. The call processing device, e.g., SBC 220, then takes an action, e.g., implement a call handling rule, based on the generated probability value that the new call is a robocall. Exemplary call handling rules include those previously discussed in connection with method 1000 and include completing the new incoming call to a device corresponding to the called party number included in the incoming call with an indication that the incoming call is a suspect robocall, redirecting the new incoming call, to a validation service, assigning the new incoming call to a lower incoming call priority than an non-suspect robocall call when placing the incoming call in a call handling queue, delivering the incoming call to voice mail, delivering the incoming call to an automated attendant, or dropping or blocking the incoming call.

A more detailed description will now be provided of how multiple calling party source identifiers may be used in connection with identifying and performing call handling operations on suspected robocalls.

First, P(R|Si=si) is determined (P stands for probability, R stands for robocall, Si=si stands for calling party source identifier equal to the calling party source identifier for the particular calling party source identifier i), that is the probability that a call is a robocall is determined given each of the S1, S2, S3, S4, S5, S6, and S7 calling party source identifiers. So for each of the seven categories (S1, S2, S3, S4, S5, S6, and S7) and for each value in that category, we compute the probability that a call is a robocall given that it has that value in that category. So, for example, for a From calling number of 7325551212, we might figure out that P(R|S1="7325551212")=0.7. If the probability is predictive of being a robocall (say above a threshold of 0.5 as an example is predictive of the call being a robocall), then the (<category, value>, probability) are stored in the robocall-suspect database. In this example the following would be stored in the suspect robocall database, (S1, 7325551212, 0.7).

Second, a model is then generated for the probability that the incoming call is robocall:

$$P(R|S1,S2,\ldots,S7)=\text{sigmoid}(w1 \cdot P(R|S1)+w2 \cdot P(R|S2)+\ldots+w7 \cdot P(R|S7)).$$

Machine learning techniques are used to determine the optimal values for weights w1, w2, . . . , w7. A probability threshold P(R>r) that the call is predicted to be a robocall is also determined which takes into account the desired tradeoff between precision and recall, where precision is the probability that the decision is correct that the incoming calls identified as suspect robocall are indeed robocalls, recall is the probability that of all the robocalls in the dataset of incoming calls how many were identified as robocalls, the balance being obtaining as high a level of recall as possible while still having acceptable level precision. For customers such as call service/sales centers lower recall but higher precision may be more important as the customer may not want to want to subject potential customer sales to calling handling for suspect robocalls wherein a sale may be lost. For other customers who primarily make outgoing calls from their communications devices, higher recall may be desirable as blocking incoming robocalls may be more important to ensure outgoing calls can be made.

Third, the weight set (w1, w2, . . . , w7) and threshold value r which are generated are distributed to the call processing devices, e.g., the SBCs. While the above three steps require some additional computations not required when a single calling party source identifier such as the calling party number is used, it is important to understand that these steps are not done as part of the calling processing of new incoming calls but is done during call record processing operations which is independent from the calling processing activities of the call processing devices performed during the receipt of incoming calls, the call record processing operation being off-line processing of the call detail records occurring as previously explained on a periodic basis.

When a new incoming call initial SIP INVITE request message is received at the call processing device, e.g., SBC, for call handling, e.g., routing, the following steps are performed.

First, the call processing device, e.g., SBC, extracts the value for each calling party source identifier S1, S2, S3, S4, S5, S6 and S7 from the SIP INVITE request message.

Second, the call processing device, e.g., SBC, obtains P(R|S1=v1), P(R|S2=v2), P(R|S3=v3), P(R|S4=v4), P(R|S5=v5), P(R|S6=v6), P(R|S7=v7) by querying the suspect robocall database using the calling party source identifiers extracted from the SIP INVITE request, i.e. making database dips. If no entry is found for a <category, value>, then that P(R|S)=0, that is if for the extracted calling party source identifier S1 there is no entry in the suspect robocall database then P(R|S1=0). The computational processing resources to make these queries is not expected to be that great given that the active number of robocaller parties is tiny relative to the total caller corpus. In other words, the number of suspect robocall calls with calling source party identifiers in the suspect robocall database will be relatively small given it reflects active robocallers. We can tune and refine this by changing the threshold required before an entry is saved in the suspect robocall database.

In the third step, the overall probability that the call is a robocall is computed based on the individual probabilities for each calling party source identifier obtained from the suspect robocall database. In this example, the overall probability that the incoming call is a robocall is determined using as a calculation of the sigmoid function of the individual probabilities that is:

$$P(R|S1,S2,S3,S4,S5,S6,S7)=\text{sigmoid}((P(R|S1=v1),P(R|S2=v2),P(R|S3=v3),P(R|S4=v4),P(R|S5=v5),P(R|S6=v6),P(R|S7=v7)),$$

where sigmoid stands for calculating the sigmoid function.

It will be understood that this is a simple and inexpensive math operation as all the weights are known and fixed at this point as they were previously provided to the call processing device during step 3 of the call record processing operations discussed above.

In the fourth step, it is determined if the computed overall probability for incoming call SIP INVITE request computed is above a previously decided threshold value and if it is then the call is determined to be a robocall and appropriate actions are taken, e.g., call handling operations. That is when $P(R|S1,S2, S3, S4, S5, S6,S7)$ is $>r$ (i.e., the threshold previously decided as the prediction of a robocall) then the call corresponding to the SIP INVITE request is to be determined to be a robocall and appropriate action is to be taken, e.g., perform calling handling operation on the call in accordance with call handling policy previously distributed for calls determined to be robocalls such as discussed above. The use of multiple calling party source identifiers while adding slightly to the complexity and processing expensive of call processing requirements of incoming calls provides a much more robust system than simply relying only incoming calling party number for detecting robocalls and as previously explained given that the expectation that the active number of robocaller parties is tiny relative the total caller corpus, the additional computation resources required are not overly taxing on the system. The steps described above in connection with the call record processing and the incoming call processing may, and in some embodiments are, performed in the suspect robocaller detector/classifier device, e.g., device 310 of system 300 or device 1210 of system 1200.

In some embodiments a plurality of separate and distinct suspect robocall databases are utilized to store the identified suspect robocalls, i.e., calling party source identifiers determined to correspond to suspect robocalls. In this way, the time it takes to query the database by the call processing devices while processing an incoming call may be diminished. For example, a separate suspect robocall database may be, and in some embodiments is, used for each of the calling party source identifier S1 to S7. The call processing device on receiving a new incoming SIP INVITE message extracts the calling party source identifying information S1 to S7 and sends queries to the S1 to S7 suspect databases to determine if the extracted calling party source identifying information S1 to S7 is included in the corresponding S1 to S7 suspect robocall databases. In this way, the queries are done in parallel and not serially, hence, speeding up the real time call processing for incoming calls. In some embodiments, separate processors or dedicated hardware in the call processing device is utilized to extract the calling party source identifying information from received incoming calls and query the corresponding suspect robocall database so that these operations as well as the queries performed by the suspect databases may be performed in parallel. For example, in some embodiments there is a separate incoming calling party source identifier extractor circuit for at least two least of the different calling party source identifiers wherein the calling party source identifier extractor circuit extracts the calling party source identifier from a SIP packet. In some cases there are separate calling party source identifier extractor circuits for each of the plurality of calling party source identifiers being used in detecting suspect robocalls, e.g., S1 to S7 calling party source identifier extractor circuits.

In some embodiments which use multiple suspect robocall databases and queries of the those databases are performed in parallel by the call processing device, the call processing device assigns a query timeout interval for receiving a response from each of the suspect robocall databases and when the query timeout interval expires the call processing device generates the probability that the incoming call is a robocall based on the responses received at that point in time. In this way, the call processing device can limit the amount of time spent on processing of an incoming call to determine if the call corresponds to a robocall and also still provide a determination that the call is a robocall based on query responses returned within the query timeout interval allotted. This can be particularly useful if one or more but not all of the suspect robocall database or communications links to the database experience problems such as delays in accessing the data or communicating the query or the result of the query.

FIG. 5 as discussed above is a drawing illustrating an assembly of components 500 which may be included in an exemplary call processing device, e.g., SBC 220 of FIG. 2, SBC 308 of FIG. 3, or the call processing devices 1204, 1206, . . . , 1208 of FIG. 12, implemented in accordance with exemplary embodiment SBC 400. Assembly of components 500 can be, and in some embodiments is, used in SBC 400. The components in the assembly of components 500 can, and in some embodiments are, implemented fully in hardware within the processor 406, e.g., as individual circuits. The components in the assembly of components 500 can, and in some embodiments are, implemented fully in hardware within the assembly of components 419, e.g., as individual circuits corresponding to the different components. In other embodiments some of the components are implemented, e.g., as circuits, within the processor 406 with other components being implemented, e.g., as circuits within assembly of components 419, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 410 of the SBC 400, with the components controlling operation of SBC 400 to implement the functions corresponding to the components when the components are executed by a processor, e.g., processor 406. In some such embodiments, the assembly of components 500 is included in the memory 410 as assembly of components 418. In still other embodiments, various components in assembly of components 500 are implemented as a combination of hardware and software, e.g., with another circuit external to the processor providing input to the processor 406 which then under software control operates to perform a portion of a component's function. While shown in the FIG. 4 embodiment as a single processor, e.g., computer, it should be appreciated that the processor 406 may be implemented as one or more processors, e.g., computers.

When implemented in software the components include code, which when executed by the processor 406, configure the processor 406 to implement the function corresponding to the component. In embodiments where the assembly of components 500 is stored in the memory 410, the memory 410 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the SBC device 400 or elements therein such as the processor 406, to perform the functions of corresponding steps illustrated and/or described in the method of one or more of the flowcharts of FIGS. 10 and 11, and/or described with respect to any of the Figures. Thus the assembly of components 500 includes various components that perform functions of corresponding steps of one or more of FIGS. 1, 2, 3, 10 and 11.

Assembly of components 500 includes the following components. A control routines component 502 configured to control the operation of the SBC 400. A communications component 504 configured to provide communications functionality including communications signaling and support for various communications protocols and interfaces. An incoming call processing component 506 configured to provide processing for incoming calls. Incoming call processing component 506 includes components 508, 510, 512, 514, and 516. In some embodiments, one or more of the incoming call processing components are sub-components of the policy and routing component 530. Calling party number identifier component 508 is configured to identify the call party number in a call. Comparator 510 is configured to compare a calling party number of an incoming call to the calling party numbers stored in a suspect robocall database. Call completion component 512 is configured to complete an incoming call in a standard manner when the incoming call is not in the suspect robocall database. In some embodiments, completing an incoming call in a standard manner includes completing, routing or delivering the incoming call to a device corresponding to the called party number included in the incoming call without any indication that the incoming call is a possible robocall. Determinator component 514 is configured to determine a call handling rule based on the stored probability associated with the calling party number of an incoming call identified as a suspect robocall. Call handling component 516 is configured to handle the incoming call as a suspect robocall when the incoming calling party number is in the suspect robocall database. Call handling component 516 includes components 518, 520, 522, and 524. Suspect robocall indication component 518 is configured to complete the incoming call to a device corresponding to the called party number included in the incoming call with an indication that the incoming call is a suspect robocall, e.g., an indication that causes the display of the device to display a message such as "SUSPECTED ROBOCALL" and/or causes a suspect robocall audio tone or message to play on the device when the incoming call is delivered to the device. Suspect robocall re-direction component 520 is configured to re-direct the incoming call to a validation service. Suspect robocall assignment component 522 is configured to assign the incoming call a lower call priority than a non-suspect robocall when placing the incoming call in a call handling queue. Suspect robocall drop component 524 is configured to drop or block the incoming call.

Assembly of components 500 further includes components 526, 528, and 530. Call detail record generator component 526 is configured to generate call detail records from call information. Database storage component is configured to access, retrieve, and store information in databases, e.g., call detail records, calling party numbers, probability values and/or call handling rules. In some embodiments, call handling rules are stored in the suspect robocall database in association with calling party numbers by the robocall detector so that the SBC can retrieve a call handling rule to be applied to the suspect robocall with a matching calling party number. This is sometimes done in place of or in addition to providing probability values to be used to determine call handling rules for a suspect robocall calling party number.

Policy and routing component 530 is configured to determine routing decisions and rules based on policies and to distribute the determining routing decisions and rules to network entities for implementation.

FIG. 7 as discussed above is a drawing illustrating an assembly of components 700 which may be included in an exemplary suspect robocall detector device 600, e.g., suspect robocall detector 310 of FIG. 3 implemented in accordance with exemplary embodiment suspect robocall detector 600. Assembly of components 700 can be, and in some embodiments is, used in suspect robocall detector 600. The components in the assembly of components 700 can, and in some embodiments are, implemented fully in hardware within the processor 606, e.g., as individual circuits. The components in the assembly of components 700 can, and in some embodiments are, implemented fully in hardware within the assembly of components 619, e.g., as individual circuits corresponding to the different components. In other embodiments some of the components are implemented, e.g., as circuits, within the processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the suspect robocall detector 600, with the components controlling operation of suspect robocall detector 600 to implement the functions corresponding to the components when the components are executed by a processor, e.g., processor 606. In some such embodiments, the assembly of components 700 is included in the memory 610 as assembly of components 618. In still other embodiments, various components in assembly of components 700 are implemented as a combination of hardware and software, e.g., with another circuit external to the processor providing input to the processor 606 which then under software control operates to perform a portion of a component's function. While shown in the FIG. 6 embodiment as a single processor, e.g., computer, it should be appreciated that the processor 606 may be implemented as one or more processors, e.g., computers.

When implemented in software the components include code, which when executed by the processor 606, configure the processor 606 to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the suspect robocall device 600 or elements therein such as the processor 606, to perform the functions of corresponding steps illustrated and/or described in the method of one or more of the flowcharts of FIGS. 10 and 11, and/or described with respect to any of the Figures. Thus the assembly of components 700 includes various components that perform functions of corresponding steps of one or more of FIGS. 1, 2, 3, 10 and 11.

Assembly of components 700 includes the following components. A control routines component 702 configured to control the operation of the suspect robocall device. A communications component 703 configured to provide communications functionality including communications signaling and support for various communications protocols and interfaces. Machine learning component 704 configured to build one or more suspect robocall classifier models. A call classification model generator component 710 configured to generate at least one call classification model to be used to identify possible robocalls. The call classification model generator component 710 includes components 712, 714, and 716. Suspect robocall call pattern generator 712 is configured to generate from call detail records of a set of customer previously received suspect robocalls, call pattern information indicative of a suspect robocall. Suspect robocall call pattern generator 712 generates from customer call detail records with a set of previously received suspect robocalls, call pattern information indicative of a suspect robocall. Suspect robocall call characteristic generator 714 is configured to generate from call detail records of a set of customer previously received suspect robocalls, a set of call characteristics indicative of a suspect robocall. Suspect robocall call characteristic generator 714 generates from customer call detail records with a set of previously received suspect robocalls, a set of call characteristics indicative of a suspect robocall. Probability predictor generator component 716 configured to generate a call characteristic weight and/or probability value for call characteristic(s) and call pattern(s) identified as indicative of a suspect robocall. In some embodiments the generator component 716 also generates and/or identifies a call handling rule to be implemented for identified suspect robocalls based on the predicted probability that the suspect robocall is an actual robocall.

Assembly of components 700 further includes components 706, 708, 718, 720, 722, 724, 726 and 728. Database storage component 706 is configured to access, retrieve, store and delete information, e.g., CDRs, suspect robocall calling party numbers, probability values, call handling rules, in databases. Comparator component 708 is configured to compare calling party numbers in accessed call records to the calling party numbers in a labeling database to identify calls which are from known or likely robocallers. Process and update suspect robocall database component 718 is configured to: (i) add additionally identified suspect robocall incoming calling party numbers to a suspect robocall database after processing of customer records identifies additional suspect robocall calling party numbers, (ii) delete from a list of suspect robocall calling party numbers in the suspect robocall database calling party telephone numbers which have not been identified as suspect robocall telephone numbers by the processing of customer call records for a set period of time. Parser & aggregator component 720 configured to parse labeled CDRs and aggregate the labeled CDRs with features.

Model parameterization component 722 configured to generate a suspect robocall classification model using a machine learning algorithm.

Aggregator and feature extractor component 726 is configured to aggregate raw CDRs based on features extracted from the CDRs to generate CDRs with features and/or labels to be input to a call classifier for classification in detecting suspect robocalls.

Classifier component 724 is configured to classify incoming calling party numbers as suspect robocalls or not suspect robocalls using a classification model and to generate a probability that an incoming calling party number classified as a suspect robocall is an actual robocall.

Aggregator component 728 is configured to aggregate or collect into a group or set the incoming calling party numbers which have been identified as suspect robocalls with associated probabilities and/or call handling rules.

FIG. 9 as discussed above is a drawing illustrating an assembly of components 900 which may be included in an exemplary communications device 800, e.g., one or more of the communications devices previously identified in FIG. 3 (e.g., enterprise telephony system, phone, computer, voicemail system, automated attendant, robocall validation service system, end user device such as phone, smartphone, etc.) implemented in accordance with exemplary embodiment communications device 800. Assembly of components 900 can be, and in some embodiments is, used in communications device 800. The components in the assembly of components 900 can, and in some embodiments are, implemented fully in hardware within the processor 806, e.g., as individual circuits. The components in the assembly of components 900 can, and in some embodiments are, implemented fully in hardware within the assembly of components 819, e.g., as individual circuits corresponding to the different components. In other embodiments some of the components are implemented, e.g., as circuits, within the processor 806 with other components being implemented, e.g., as circuits within assembly of components 819, external to and coupled to the processor 806. As should be appreciated the level of integration of components on the processor and/or with some components being external to the processor may be one of design choice. Alternatively, rather than being implemented as circuits, all or some of the components may be implemented in software and stored in the memory 810 of the communications device 800, with the components controlling operation of communications device 800 to implement the functions corresponding to the components when the components are executed by a processor, e.g., processor 806. In some such embodiments, the assembly of components 900 is included in the memory 810 as assembly of components 818. In still other embodiments, various components in assembly of components 900 are implemented as a combination of hardware and software, e.g., with another circuit external to the processor providing input to the processor 806 which then under software control operates to perform a portion of a component's function. While shown in the FIG. 8 embodiment as a single processor, e.g., computer, it should be appreciated that the processor 606 may be implemented as one or more processors, e.g., computers.

When implemented in software the components include code, which when executed by the processor 806, configure the processor 806 to implement the function corresponding to the component. In embodiments where the assembly of components 900 is stored in the memory 810, the memory 810 is a computer program product comprising a computer readable medium comprising code, e.g., individual code for each component, for causing at least one computer, e.g., processor 806, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the communications device 800 or elements therein such as the processor 806, to perform the functions of corresponding steps illustrated and/or described in the method of one or more of the flowcharts of FIGS. 10 and 11, and/or described with respect to any of the Figures. Thus the assembly of components 900 includes various components that perform functions of corresponding steps of one or more of FIGS. 1, 2, 3, 10 and 11.

Assembly of components 900 includes the following components: a control routines component 902 configured to control the operation of the communications device, a display component 904 configured to display information on the communications device's display, e.g., the message "SUSPECT ROBOCALL", a communications component 906 configured to provide communications functionality including communications signaling and support for various communications protocols and interfaces, and an automated attendant component 908 configured to perform automated attendant functions. The automated attendant component 908 including components 910, 912 and 914. Playing audio messages component 910 is configured to play audio messages such as a list of individuals to which the call is to be directed requesting the selection of the individual to which to route the call. The detecting audio input component 912 configured to detect touch tones or voice commands as to how to direct the call. The routing call component 914 configured to route the call based on an audio command e.g., touch tone or voice command, inputted and detected by the communications device. The automated attendant component may be incorporated in a telephony system, a voice mail system or in a stand alone automated attendant communications device.

The assembly of components 900 for use in a communications device further includes voice messaging component 920 configured to perform voice mail functions such as for example (i) play one or more audio messages to a caller, (ii) record and store audio messages left by the caller as well as call and caller identification information, (iii) notify the intended and/or identified recipient of the recorded message, (iv) playback recorded message, and (v) delete recorded message. The voice messaging component 920 is typically incorporated into voice messaging system and telephony systems.

The assembly of components for use in a communications device 900 further includes components 922, 924, 926, 928 and 930.

The robocall validation component 922 is configured to receive an incoming call, play an audio CAPTCHA challenge to the caller, receive an audio response from the caller, determine if the audio response is a correct response to the audio challenge, forward the call to destination device when the audio response is determined to be correct, and when the audio response is determined to be incorrect administer additional audio CAPTCHA test, forward call to voicemail, or forward call to a device with human operator who can determine whether the call is a robocall or is not a robocall and direct it to its intended destination.

The telephony call routing component 924 is configured to route calls is typically included in telephony systems, automated attendants, and some robocall validation systems. The telephony call routing components can in some embodiments receive call handling rules, policies and/or routing decisions from the SBC and route the call in accordance with the received call handling rules, policies and/or routing decisions.

The network routing component 926 is configured to route calls via network entities, e.g., IMS network switches. The call generation component 928 is configured to initiate call(s) including all call signaling required to establish and maintain a call. The call termination component 922 is configured to receiving incoming calls, maintain calls, and end calls at completion of a call including all related call signaling.

It should be understood that not all components identified in the assembly of components 500, 700, and 900 need be included in the devices. For example with respect to assembly of components 700 some of the components and/or their functionality may be implemented in other components, e.g., components 720, 722, 724, 726, and 728 and/or their described functionality may be incorporated in other components such as for example components 704 or 710 of a suspect robocall detector device. Similarly different communications devices may implement only some of the components of the assembly of components 900, e.g., a smartphone communications device would not include or utilize an automated attendant component.

In one or more of the aforementioned embodiments, the following features may be, and in some embodiments are, implemented. When a calling party source identifying number, e.g., calling party telephone number, is determined to have been incorrectly classified as a suspect robocall, the calling party source number is inputted to the suspect robocall detector/classifier device which adds the mis-identified calling party source identifier to a white list. The suspect robocall detector/classifier deletes the mis-identified calling party source identifier from the suspect robocall database and in the future compares calling party source identifiers determined to be suspect robocalls to the white list before storing the calling party source identifier in the suspect robocall database. When a match occurs between the determined calling party source identifier on the white list and the determined calling party source identifier classified as a suspect robocall, the suspect robocall detection device refrains from storing the calling party source identifier in the suspect robocall database. Robocall calling party source identification information, e.g., calling party numbers, which the user of the system may wish to have treated as non-robocalls may also be placed on the white list. Examples of such robocalls are robocalls from law enforcement, federal, state or local governments, schools, utility companies, e.g., electric, gas or water companies or services providing emergency messages regarding emergency situations such as power outages, floods, tornadoes, hurricanes, snow storms, environmental disasters, closures of government facilities, roads, schools, or problems with water, gas, electric service. The use of the white list for such emergency robocalls would ensure that they are treated as non-robocalls.

In some embodiments, a suspect robocall database and a comprehensive robocall database, e.g., FCC consumer complaint database, are used. The call processing device sends a query with the incoming calling party source identifier, e.g., calling party number, to both databases in parallel. If the calling party source identifier is an active robocall in the system, the query response to the suspect robocall database will respond first as it is a much smaller database. If the response from the suspect robocall database identifies the calling party source identifier as a suspect robocall the call processing device acts immediately upon the call without waiting for the response to the comprehensive robocall database which includes all known robocalls, the action being one or more of the aforementioned call handling actions discussed above. If, however, the query response from the suspect robocall database does not identify the calling party source identifier of incoming call as suspect robocall, the call processing device waits for the response to the query to the comprehensive robocall database. If the response from the comprehensive robocall database identifies the calling party source identifier of the incoming call as a robocall the call processing device takes one or more of the call handling actions previously described. If the response from the comprehensive robocall database does not identify the calling party source identifier as a suspect robocall the call processing device then performs normal call handling operations on the incoming call such as for example completing the call to the called party destination identified in the incoming call, e.g., SIP INVITE request. Such a system configuration allows for quick determinations when an incoming call is an active robocall and also provides for the detection of new robocalls whose calling party source identifiers, e.g., calling party numbers, have not yet been included in the comprehensive robocall database. Systems so configured provide additional robocall detection and protection from systems which use only the suspect robocall database or only the comprehensive robocall database. In some such embodiments such as where the time to search the database is not an issue the suspect robocalls are included into the suspect robocall database with their determined probabilities while the known robocall numbers in the database are assigned a probability of 1 (or 100%).

Set forth below are various exemplary numbered embodiments. Each set of numbered exemplary embodiments is numbered by itself with embodiments in a set referring to previous numbered embodiments in the same set.

List of First Set of Exemplary Numbered Method Embodiments

Method Embodiment 1

A method of processing calls to a customer (e.g., an enterprise), the method comprising: processing call records of said customer to identify calls which are possibly from a robocaller, based on at least one of i) a call characteristic (e.g., a media characteristic for the call such as jitter, latency, round trip time, or a SIP characteristic of the call such as order of SIP headers and/or parameters in a SIP invite message corresponding to a call, formatting of SIP headers and/or their values, and/or SIP body formatting and SIP body content) or ii) a call pattern, said call pattern including at least one of an error rate, call rate, call diversity or start-to-start time between adjacent calls from a call source (e.g., a network or enterprise, e.g., a VoIP network from which multiple calls are received), each identified call having a calling party number; storing calling party source identification information (e.g., calling party numbers) of the identified calls in a suspect robocall database; processing an incoming call, said processing including comparing calling party source identification information of an incoming call to the calling party source identification information in the suspect robocall database; and completing the incoming call in a standard manner if the incoming calling party source identification information is not in the suspect robocall database; and handling the incoming call as a suspect robocall if the incoming calling party source identification information is in the suspect robocall database.

Method Embodiment 2

The method of method embodiment 1, wherein said calling party source identification information includes one or more of the following: a calling party number, a Session Initiation Protocol (SIP) agent name, an Internet Protocol address, a source Internet Protocol (IP) address and SIP agent ID, contact header information in a call initiation request, content of first VIA header in a call initiation request.

Method Embodiment 3

The method of method embodiment 1 further comprising identifying that said incoming call is a suspect robocall based on calling party source identification information that is not a calling party number.

Method Embodiment 4

The method of method embodiment 1 wherein said incoming call is a SIP INVITE request and the calling party source identification includes one or more of the following: (i) calling party user information from a SIP From header of the SIP INVITE request, (ii) calling party user information from a P-Asserted-ID header of the SIP INVITE request, (iii) an ingress peer signaling address included in the SIP INVITE request; (iv) an ingress peer signaling address from a SIP Contact header of the SIP INVITE request, (v) an ingress peer address from the first Via header of the SIP INVITE request; (vi) a digest of a SIP user agent string of the SIP INVITE request.

Method Embodiment 5

The method of method embodiment 1 wherein said incoming call is a SIP INVITE request and the calling party source identification includes at least a calling party number and one or more of the following: (i) calling party user information from a SIP From header of the SIP INVITE request, (ii) calling party user information from a P-Asserted-ID header of the SIP INVITE request, (iii) an ingress peer signaling address included in the SIP INVITE request; (iv) an ingress peer signaling address from a SIP Contact header of the SIP INVITE request, (v) an ingress peer address from the first Via header of the SIP INVITE request; (vi) a digest of a SIP user agent string of the SIP INVITE request.

Method Embodiment 6

The method of method embodiment 1 wherein said calling party source identification information includes an originating telephone number from an Identity header of a call initiation request.

Method Embodiment 7

The method of method embodiment 1 wherein said calling party source identification information includes a calling party number included in incoming calling line identification (ICLID) information included in said incoming call.

Method Embodiment 8

The method of method embodiment 1 wherein said calling party source identification information includes a calling party number included in said incoming call, said incoming call being an ISDN (Integrated Services Digital Network) call and said calling party number being included in ISDN User Part Initial address message (IAM) of said ISDN call.

Method Embodiment 9

The method of method embodiment 2 wherein said calling party source identification information includes a plurality of calling party source identifiers.

Method Embodiment 10

The method of method embodiment 1, wherein said calling party source identification information includes a calling party number.

Method Embodiment 11

The method of method embodiment 1, wherein said calling party source identification is a calling party number.

Method Embodiment 12

The method of method embodiment 1, wherein completing the incoming call in a standard manner includes completing the incoming call to a device corresponding to a called party number included in the incoming call without any indication that the incoming call is a possible robocall.

Method Embodiment 13

The method of method embodiment 1, wherein handling the call as a suspect robocall includes at least one of: i) completing the incoming call to a device corresponding to a called party number included in the incoming call with an indication that the incoming call is a suspect robocall; ii) redirecting the incoming call to a validation service; iii) assigning the incoming call a lower incoming call priority than a non-suspect robocall when placing the incoming call in a call handling queue (thereby resulting in suspect robocalls having a longer delay before being answered on average than non-suspect robocalls); iv) delivering the incoming call to voice mail or v) dropping or blocking the incoming call.

Method Embodiment 14

The method of method embodiment 13, further comprising: storing with individual calling party source identification information entries (e.g., calling party source identifiers such as a calling party numbers) of the identified calls in the suspect robocall database a probability that the individual calling party source identification information entry corresponds to an actual robocall (e.g., for each calling party source identifier entry store a probability that the calling party source identifier corresponds to an actual robocall); and herein processing the incoming call further includes determining, based on the stored probability associated with the calling party source identification information of a suspect incoming call, a call handling rule.

Method Embodiment 15

The method of method embodiment 14 wherein when said calling party source identification includes a plurality of calling party source identifiers, determining based on the stored probability associated with the calling party source identification information of a suspect incoming call, a call handling rule includes determining based on the probability stored with each of the calling party source identifiers.

Method Embodiment 16

The method of method embodiment 14, wherein handling the call as a suspect robocall includes determining what action to take based on the probability that the incoming call is a robocall.

Method Embodiment 17

The method of method embodiment 16, wherein a higher probability that an incoming call is a robocall causes a lower call handling priority to be assigned than is assigned when an incoming call has a lower probability of being a robocall.

Method Embodiment 18

The method of method embodiment 1 further including: processing a plurality of additional incoming calls to identify suspect robocalls based on the incoming calls calling party source identification information; said processing including comparing calling party source identification information of said incoming calls to the calling party source identification information in the suspect robocall database, said processing of said incoming calls being independent of said processing call records of said customer to identify calls which are possibly from a robocaller.

Method Embodiment 19

The method of method embodiment 18 wherein said processing of said incoming call and said plurality of additional incoming calls is performed by a first processing device including a first set of processors and wherein said processing call records of said customer to identify calls which are possibly from a robocaller is performed by a second processing device includes a second set of processors.

Method Embodiment 20

The method of method embodiment 19 further comprising: detecting an increase in the number of incoming calls in said plurality of additional incoming calls to be processed over a period of time with respect to a threshold value; comparing the number of incoming calls to be processed to said threshold value; and when said comparing determines that the number of incoming calls to be processed exceeds said threshold automatically adding one or more processors to the first set of processors without adjusting the number of processors in said second set of processors.

Method Embodiment 21

The method of method embodiment 20 further comprising: detecting an increase in the number of call records of said customer to be processed to identify calls which are possibly from a robocaller over a period of time with respect to a threshold value; comparing the number of call records of said customer to identify calls which are possibly from a robocall to be processed to said threshold value; and when said comparing determines that the number of calling records to be processed exceeds said threshold automatically adding one or more processors to the second set of processors without adjusting the number of processors in said first set of processors.

Method Embodiment 22

The method of method embodiment 1, wherein said customer is a telephony service provider; said calls to said customer are incoming calls to a network operated by said telephony service provider.

Method Embodiment 23

The method of method embodiment 1, wherein said customer is an enterprise customer; and wherein said step of processing call records of said customer is performed on a periodic basis for calls to said enterprise customer.

Method Embodiment 24

The method of method embodiment 23, wherein said enterprise customer can control the periodic basis of said processing of call records to control the periodicity at which said database of suspect robocall calling party numbers is updated.

Method Embodiment 25

The method of method embodiment 24, wherein updating said database includes deleting from said list of suspect robocall calling party numbers telephone numbers which have not been identified as suspect robocall telephone numbers by the processing of said customer call records for a set period of time (e.g., remove numbers which have not been determined to be suspect for a day).

Method Embodiment 26

The method of method embodiment 1, wherein the processing of call records of said customer to identify calls which are possibly from a robocaller is performed by a device external to a session boarder controller which routes calls to said enterprise customer.

Method Embodiment 27

The method of method embodiment 26, wherein said comparing a calling party number of an incoming call to the calling party numbers in the suspect robocall database is performed by the session border controller for all calls directed to phone numbers corresponding to the enterprise.

Method Embodiment 28

The method of method embodiment 27, wherein said suspect robocall database is a locally maintained database at a site of the enterprise customer.

Method Embodiment 29

The method of method embodiment 1, wherein said suspect robocall database includes fewer records than a labeling database of reported possible robocalls used to identify characteristics of robocalls.

Method Embodiment 30

The method of method embodiment 29, wherein said processing call records of said customer to identify calls which are from a robocaller, is based on at least one of i) a call characteristic or ii) a call pattern includes identifying calls which are from a robocaller which are not included in said labeling database.

Method Embodiment 31

The method of method embodiment 29 wherein said processing the incoming call includes detecting the incoming call as a robocall based on calling party information contained in said suspect robocall database when said calling party number is not included in said labeling database.

Method Embodiment 32

The method of method embodiment 31 wherein said calling party information contained in said suspect robocall database is a calling party number not included in said labeling database.

Method Embodiment 33

The method of method embodiment 29 further comprising: generating a call classification model to be used to identify possible robocalls, said step of generating a call classification model including: accessing a set of call detail records (CDRs) of the customer for a period of time (e.g., month); comparing calling party numbers in the accessed call records to the calling party numbers in at least one database of reported possible robocallers to identify calls which are from known or likely robocallers, said identified calls being a set of previously received suspect robocalls; generating from the call detail records of the set of previously received suspect robocalls, call pattern information indicative of a suspect robocall.

Method Embodiment 34

The method of method embodiment 33, further comprising: generating from said call pattern information indicative of a suspect call one or more call classification models which can be used when processing new incoming calls to identify suspect robocalls.

Method Embodiment 35

The method of method embodiment 33 wherein said at least one database of known robocallers includes the FCC consumer complaint database.

Method Embodiment 36

The method of method embodiment 33 wherein said at least one database of known robocallers includes only royalty free databases.

Method Embodiment 37

The method of method embodiment 33 wherein said at least one database of known robocallers includes a plurality of databases of known robocallers.

Method Embodiment 38

The method of method embodiment 37 wherein said plurality of databases of known robocallers includes both royalty free and royalty bearing databases.

Method Embodiment 39

The method of method embodiment 28, wherein said suspect robocall database includes fewer records than a labeling database of reported possible robocalls used to identify characteristics of robocalls.

Method Embodiment 40

The method of method embodiment 28, wherein said suspect robocall database includes fewer records than a labeling database of reported robocalls used to identify characteristics of robocalls.

Method Embodiment 41

The method of method embodiment 40, wherein said labeling database is not a training database.

Method Embodiment 42

The method of method embodiment 40, wherein said labeling database is used to generate a machine learning training database containing calling party numbers of both robocalls and non-robocalls.

Method Embodiment 43

The method of method embodiment 39, further comprising: generating a call classification model to be used to identify possible robocalls, said step of generating a call classification model including: accessing a set of call detail records (CDRs) of the enterprise for a period of time (e.g., month); comparing calling party numbers in the accessed call records to the calling party numbers in an FCC consumer complaint database to identify calls which are from known or likely robocallers, said identified calls being a set of previously received suspect robocalls; generating from the call detail records of the set of previously received suspect robocalls, call pattern information indicative of a suspect robocall.

Method Embodiment 44

The method of method embodiment 43, further comprising: generating from said call pattern information indicative of a suspect call one or more call classification models which can be used when processing new incoming calls to identify suspect robocalls.

Method Embodiment 45

A method of processing calls to a customer (enterprise), the method comprising: processing call records of said customer to identify calls which are possibly from a robocaller, based on at least one of i) a call characteristic (e.g., a media characteristic for the call such as jitter, latency, round trip time, or a SIP characteristic of the call such as order of SIP headers and/or parameters in a SIP invite message corresponding to a call, formatting of SIP headers and/or their values, and/or SIP body formatting and SIP body content) or ii) a call pattern, said call pattern including at least one of an error rate, call rate, call diversity or start-to-start time between adjacent calls from a call source (e.g., a network or enterprise, e.g., a VoIP network from which multiple calls are received), each identified call having a calling party number; storing the calling party numbers of the identified calls in a suspect robocall database; processing an incoming call, said processing including comparing a calling party number of an incoming call to the calling party numbers in the suspect robocall database; and completing the incoming call in a standard manner if the incoming call is not in the suspect robocall database; and handling the incoming call as a suspect robocall if the incoming calling party number is in the suspect robocall database.

Method Embodiment 46

The method of method embodiment 45, wherein completing the incoming call in a standard manner includes completing the incoming call to a device corresponding to the called party number included in the incoming call without any indication that the incoming call is a possible robocall.

Method Embodiment 47

The method of method embodiment 45, wherein handling the call as a suspect robocall includes at least one of: i) completing the incoming call to a device corresponding to the called party number included in the incoming call with an indication that the incoming call is a suspect robocall; ii) redirecting the incoming call to a validation service; iii) assigning the incoming call a lower incoming call priority than a non-suspect robocall when placing the incoming call in a call handling queue (thereby resulting in suspect robocalls having a longer delay before being answered on average than non-suspect robocalls); iv) delivering the incoming call to voice mail or v) dropping or blocking the incoming call.

Method Embodiment 48

The method of method embodiment 47, further comprising: storing with individual calling party numbers of the identified calls in the suspect robocall database a probability that the individual calling party number corresponds to an actual robocaller; and wherein processing the incoming call further includes determining, based on the stored probability associated with the calling party number of a suspect incoming call, a call handling rule.

Method Embodiment 49

The method of method embodiment 48, wherein handling the call as a suspect robocall includes determining what action to take based on the probability that the incoming call is a robocall.

Method Embodiment 50

The method of method embodiment 49, wherein a higher probability that an incoming call is a robocall causes a lower call handling priority to be assigned than is assigned when an incoming call has a lower probability of being a robocall.

Method Embodiment 51

The method of method embodiment 45, wherein said customer is an enterprise customer; and wherein said step of processing call records of said customer is performed on a periodic basis for calls to said enterprise customer.

Method Embodiment 52

The method of method embodiment 51, wherein said enterprise customer can control the periodic basis of said processing of call records to control the periodicity at which said database of suspect robocall calling party numbers is updated.

Method Embodiment 53

The method of method embodiment 52, wherein updating said database includes deleting from said list of suspect robocall calling party numbers telephone numbers which have not been identified as suspect robocall telephone numbers by the processing of said customer call records for a set period of time (e.g., remove numbers which have not been determined to be suspect for a day).

Method Embodiment 54

The method of method embodiment 45, wherein the processing of call records of said customer to identify calls which are possibly from a robocaller is performed by a device external to a session boarder controller which routes calls to said enterprise customer.

Method Embodiment 55

The method of method embodiment 54, wherein said comparing a calling party number of an incoming call to the calling party numbers in the suspect robocall database is performed by the session border controller for all calls directed to phone numbers corresponding to the enterprise.

Method Embodiment 56

The method of method embodiment 55, wherein said suspect robocall database is a locally maintained database at a site of the enterprise customer.

Method Embodiment 57

The method of method embodiment 56, wherein said suspect robocall database includes fewer records than a labeling database of reported possible robocalls used to identify characteristics of robocalls.

Method Embodiment 58

The method of method embodiment 57, further comprising: generating a call classification model to be used to identify possible robocalls, said step of generating a call classification model including: accessing a set of call detail records (CDRs) of the enterprise for a period of time (e.g., month); comparing calling party numbers in the accessed call records to the calling party numbers in an FCC consumer complaint database to identify calls which are from known or likely robocallers, said identified calls being a set of previously received suspect robocalls; generating from the call detail records of the set of previously received suspect robocalls, call pattern information indicative of a suspect robocall.

Method Embodiment 59

The method of method embodiment 58, further comprising: generating from said call pattern information indicative of a suspect call one or more call classification models which can be used when processing new incoming calls to identify suspect robocalls.

List of First Set of Exemplary Numbered System Embodiments

System Embodiment 1

A system of processing calls to a customer (e.g., enterprise), the system comprising: a suspect robocall detector device including: a first processor configured to control the suspect call detector device to process call records of said customer to identify calls which are possibly from a robocaller, based on at least one of i) a call characteristic (e.g., a media characteristic for the call such as jitter, latency, round trip time, or a SIP characteristic of the call such as order of SIP headers and/or parameters in a SIP invite message corresponding to a call, formatting of SIP headers and/or their values, and/or SIP body formatting and SIP body content) or ii) a call pattern, said call pattern including at least one of an error rate, call rate, call diversity or start-to-start time between adjacent calls from a call source (e.g., a network or enterprise, e.g., a VoIP network from which multiple calls are received), each identified call having a calling party number, and a first memory; a suspect robocall database for storing calling party source identification information (e.g., calling party numbers) of the identified calls which are possibly from a robocaller; a call processing device (e.g., a Session Border Controller (SBC)) including: a second processor configured to operate the call processing device (e.g., SBC) to: process an incoming call, said process an incoming call including comparing calling party source identification information (e.g., a calling party number) of an incoming call to the calling party source identification information (e.g., calling party numbers) in the suspect robocall database; and complete the incoming call in a standard manner if the incoming call is not in the suspect robocall database; and handle the incoming call as a suspect robocall if the incoming calling party source identification information (e.g., calling party number) is in the suspect robocall database.

System Embodiment 2

The system of system embodiment 1, wherein said calling party source identification information includes one or more of the following: a calling party number, a Session Initiation Protocol (SIP) agent string, an Internet Protocol address, a source Internet Protocol (IP) address, contact header information in a call initiation request, content of first VIA header in a call initiation request.

System Embodiment 3

The system of system embodiment 1 wherein said second processor is further configured to operate the call processing device to identify that said incoming call is a suspect robocall based on calling party source identification information that is not a calling party number.

System Embodiment 4

The system of system embodiment 1 wherein said incoming call is a SIP INVITE request and the calling party source identification includes one or more of the following: (i) calling party user information from a SIP From header of the SIP INVITE request, (ii) calling party user information from a P-Asserted-ID header of the SIP INVITE request, (iii) an ingress peer signaling address included in the SIP INVITE request; (iv) an ingress peer signaling address from a SIP Contact header of the SIP INVITE request, (v) an ingress peer address from the first Via header of the SIP INVITE request; (vi) a digest of a SIP user agent string of the SIP INVITE request.

System Embodiment 5

The system of system embodiment 1 wherein said incoming call is a SIP INVITE request and the calling party source identification includes at least a calling party number and one or more of the following: (i) calling party user information from a SIP From header of the SIP INVITE request, (ii) calling party user information from a P-Asserted-ID header of the SIP INVITE request, (iii) an ingress peer signaling address included in the SIP INVITE request; (iv) an ingress peer signaling address from a SIP Contact header of the SIP INVITE request, (v) an ingress peer address from the first Via header of the SIP INVITE request; (vi) a digest of a SIP user agent string of the SIP INVITE request.

System Embodiment 6

The system of system embodiment 1 wherein said calling party source identification information includes an originating telephone number from an Identity header of a call initiation request.

System Embodiment 7

The system of system embodiment 1 wherein said calling party source identification information includes a calling party number included in incoming calling line identification (ICLID) information included in said incoming call.

System Embodiment 8

The system of system embodiment 1 wherein said calling party source identification information includes a calling party number included in said incoming call, said incoming call being an ISDN (Integrated Services Digital Network) call and said calling party number being included in ISDN User Part Initial address message (IAM) of said ISDN call.

System Embodiment 9

The system of system embodiment 2 wherein said calling party source identification information includes a plurality of calling party source identifiers.

System Embodiment 10

The system of system embodiment 1, wherein said calling party source identification information includes a calling party number.

System Embodiment 11

The system of system embodiment 1, wherein said calling party source identification is a calling party number.

System Embodiment 12

The system of system embodiment 1, wherein complete the incoming call in a standard manner includes completing the incoming call to a device corresponding to a called party number included in the incoming call without any indication that the incoming call is a possible robocall.

System Embodiment 13

The system of system embodiment 1, wherein handle the call as a suspect robocall includes at least one of: i) completing the incoming call to a device corresponding to the called party number included in the incoming call with an indication that the incoming call is a suspect robocall; ii) redirecting the incoming call to a validation service; iii) assigning the incoming call a lower incoming call priority than a non-suspect robocall when placing the incoming call in a call handling queue (thereby resulting in suspect robocalls having a longer delay before being answered on average than non-suspect robocalls); iv) delivering the incoming call to voice mail or v) dropping or blocking the incoming call.

System Embodiment 14

The system of system embodiment 13, wherein said first processor of said robocall detector device is further configured to control said suspect robocall detector device to store with individual calling party source identification information entries (e.g., individual calling party numbers) of the identified calls in the suspect robocall database a probability that the individual calling party source identification entry (e.g., individual calling party number) corresponds to an actual robocall; and wherein processing the incoming call further includes determining, based on the stored probability associated with the calling party source identification information (e.g., calling party number) of a suspect incoming call, a call handling rule.

System Embodiment 15

The system of system embodiment 14 wherein when said calling party source identification includes a plurality of calling party source identifiers, determining based on the stored probability associated with the calling party source identification information of a suspect incoming call, a call handling rule includes determining based on the probability stored with each of the calling party source identifiers.

System Embodiment 16

The system of system embodiment 14, wherein handle the call as a suspect robocall includes determining what action to take based on the probability that the incoming call is a robocall.

System Embodiment 17

The system of system embodiment 16, wherein a higher probability that an incoming call is a robocall causes a lower call handling priority to be assigned than is assigned when an incoming call has a lower probability of being a robocall.

System Embodiment 18

The system of system embodiment 1 wherein said second processor is configured to operate the call processing device to: process a plurality of additional incoming calls to identify suspect robocalls based on the incoming calls calling party source identification information; said processing including comparing calling party source identification information of said incoming calls to the calling party source identification information in the suspect robocall database, said processing of said incoming calls being independent of said processing call records of said customer to identify calls which are possibly from a robocaller performed by said robocall detector device.

System Embodiment 19

The system of system embodiment 18, wherein said call processing of said incoming call and said plurality of additional incoming calls is performed by a first set of processors included in said call processing device; and wherein said processing call records of said customer to identify calls which are possibly from a robocaller is performed by a second set of processors included in said suspect robocall detector device.

System Embodiment 20

The system of system embodiment 19 wherein said second processor is further configured to operate the call processing device to: detect an increase in the number of incoming calls in said plurality of additional incoming calls to be processed over a period of time with respect to a threshold value; compare the number of incoming calls to be processed to said threshold value; and when said comparison determines that the number of incoming calls to be processed exceeds said threshold automatically adding one or more processors to the first set of processors without adjusting the number of processors in said second set of processors.

System Embodiment 21

The system of system embodiment 20 wherein said first processor is further configured to operate the suspect robocall detector device to: detect an increase in the number of call records of said customer to be processed to identify calls which are possibly from a robocaller over a period of time with respect to a threshold value; compare the number of call records of said customer to identify calls which are possibly from a robocall to be processed to said threshold value; and when said comparison determines that the number of calling records to be processed exceeds said threshold automatically adding one or more processors to the second set of processors without adjusting the number of processors in said first set of processors.

System Embodiment 22

The system of system embodiment 1, wherein said customer is a telephony service provider; said calls to said customer are incoming calls to a network operated by said telephony service provider.

System Embodiment 23

The system of system embodiment 1, wherein said customer is an enterprise customer; and wherein said first processor is further configured to control the operation of the suspect robocall detector so that said processing of call records of said customer is performed on a periodic basis for calls to said enterprise customer.

System Embodiment 24

The system of system embodiment 23, wherein said enterprise customer can control the periodic basis of said processing of call records to control the periodicity at which said database of suspect robocall calling party source identification information (e.g., suspect robocall calling party numbers) is updated.

System Embodiment 25

The system of system embodiment 24, wherein said first processor is further configured to control said suspect robocall call detector to update said suspect robocall database, said update of said suspect robocall database including deleting from said list of suspect robocall calling party source identification information (e.g., suspect robocall calling party numbers) which have not been identified as suspect robocall numbers by the processing of said customer call records for a set period of time (e.g., remove numbers or other calling party source identifiers which have not been determined to be suspect for a day).

System Embodiment 26

The system of system embodiment 1, wherein said suspect robocall detector is a device external to said call processing device (e.g., session boarder controller) which routes calls to said enterprise customer.

System Embodiment 27

The system of system embodiment 26, wherein said comparing calling party source identification information (e.g., a calling party number) of an incoming call to the calling party source identification information (e.g., calling party numbers) in the suspect robocall database is performed by the call processing device (e.g., session border controller) for all calls directed to phone numbers corresponding to the enterprise.

System Embodiment 28

The system of system embodiment 27, wherein said suspect robocall database is a locally maintained database at a site of the enterprise customer.

System Embodiment 29

The system of system embodiment 1, wherein said suspect robocall database includes fewer records than a labeling database of reported possible robocalls used to identify characteristics of robocalls.

System Embodiment 30

The system of system embodiment 29 wherein said processing call records of said customer to identify calls which are from a robocaller, is based on at least one of i) a call characteristic or ii) a call pattern includes identifying calls which are from a robocaller which are not included in said labeling database.

System Embodiment 31

The system of system embodiment 29 wherein said processing the incoming call includes detecting the incoming call as a robocall based on calling party information contained in said suspect robocall database when said calling party number is not included in said labeling database.

System Embodiment 32

The system of system embodiment 31 wherein said calling party information contained in said suspect robocall database is a calling party number not included in said labeling database.

System Embodiment 33

The system of system embodiment 29, wherein said first processor is further configured to operate the suspect robocall detector device to: generate a call classification model to be used to identify possible robocalls, said step of generating a call classification model including: access a set of call detail records (CDRs) of the customer for a period of time (e.g., month); compare calling party numbers in the accessed call records to the calling party numbers in at least one database of reported possible robocallers to identify calls which are from known or likely robocallers, said identified calls being a set of previously received suspect robocalls; and generate from the call detail records of the set of previously received suspect robocalls, call pattern information indicative of a suspect robocall.

System Embodiment 34

The system of system embodiment 33, wherein said first processor is further configured to operate said suspect robocall detector to: generate from said call pattern information indicative of a suspect call one or more call classification models which can be used when processing new incoming calls to identify suspect robocalls.

System Embodiment 35

The system of system embodiment 33 wherein said at least one database of known robocallers includes the FCC consumer complaint database.

System Embodiment 36

The system of system embodiment 33 wherein said at least one database of known robocallers includes only royalty free databases.

System Embodiment 37

The system of system embodiment 33 wherein said at least one database of known robocallers includes a plurality of databases of known robocallers.

System Embodiment 38

The system of system embodiment 37 wherein said plurality of databases of known robocallers includes both royalty free and royalty bearing databases.

System Embodiment 39

The system of system embodiment 1, wherein said suspect robocall database includes fewer records than a labeling database of reported possible robocalls used to identify characteristics of robocalls.

System Embodiment 40

The system of system embodiment 28, wherein said suspect robocall database includes fewer records than a labeling database of reported robocalls used to identify characteristics of robocalls.

System Embodiment 41

The system of system embodiment 40, wherein said labeling database is not a training database.

System Embodiment 42

The system of system embodiment 40, wherein said labeling database is a machine learning database used to generate a machine learning training database containing calling party numbers of both robocalls and non-robocalls.

System Embodiment 43

The system of system embodiment 39 wherein said suspect robocall detector first processor is further configured to control said suspect robocall detector to: generate a call classification model to be used to identify possible robocalls, said generate a call classification model including: accessing a set of call detail records (CDRs) of the enterprise for a period of time (e.g., month); comparing calling party numbers in the accessed call records to the calling party numbers in an FCC consumer complaint database to identify calls which are from known or likely robocallers, said identified calls being a set of previously received suspect robocalls; generating from the call detail records of the set of previously received suspect robocalls, call pattern information indicative of a suspect robocall.

System Embodiment 44

The system of system embodiment 43, wherein said first processor is further configured to control said suspect robocall detector to generate from said call pattern information indicative of a suspect call one or more call classification models which can be used when processing new incoming calls to identify suspect robocalls.

System Embodiment 45

The system of system embodiment 44, wherein said first processor is further configured to control said suspect robocall detector to generate said one or more call classification models using a machine learning algorithm.

System Embodiment 46

The system of system embodiment 44, wherein said first processor is further configured to control said suspect robocall detector to generate from the call detail records of the set of previously received suspect robocalls, a set of call characteristics indicative of a suspect robocall as part of controlling said suspect robocall detector to generate a call classification model.

System Embodiment 47

The system of system embodiment 46 wherein said first processor is further configured to control the operation of the suspect robocall detector to generate a call characteristic weight value for each of the characteristics of the set of call characteristics indicative of a suspect robocall.

System Embodiment 48

A system of processing calls to a customer (enterprise), the method comprising: a suspect robocall detector device including:
a first processor configured to control the suspect call detector device to process call records of said customer to identify calls which are possibly from a robocaller, based on at least one of i) a call characteristic (e.g., a media characteristic for the call such as jitter, latency, round trip time, or a SIP characteristic of the call such as order of SIP headers and/or parameters in a SIP invite message corresponding to a call, formatting of SIP headers and/or their values, and/or SIP body formatting and SIP body content) or ii) a call pattern, said call pattern including at least one of an error rate, call rate, call diversity or start-to-start time between adjacent calls from a call source (e.g., a network or enterprise, e.g., a VoIP network from which multiple calls are received), each identified call having a calling party number, and a first memory; a suspect robocall database for storing the calling party numbers of the identified calls which are possibly from a robocaller; a Session Border Controller (SBC) including: a second processor configured to operate the SBC to: process an incoming call, said process an incoming call including comparing a calling party number of an incoming call to the calling party numbers in the suspect robocall database; and complete the incoming call in a standard manner if the incoming call is not in the suspect robocall database; and handle the incoming call as a suspect robocall if the incoming calling party number is in the suspect robocall database.

System Embodiment 49

The system of system embodiment 48, wherein complete the incoming call in a standard manner includes completing the incoming call to a device corresponding to the called party number included in the incoming call without any indication that the incoming call is a possible robocall.

System Embodiment 50

The system of system embodiment 48, wherein handle the call as a suspect robocall includes at least one of: i) completing the incoming call to a device corresponding to the called party number included in the incoming call with an indication that the incoming call is a suspect robocall; ii) redirecting the incoming call to a validation service; iii) assigning the incoming call a lower incoming call priority than a non-suspect robocall when placing the incoming call in a call handling queue (thereby resulting in suspect robocalls having a longer delay before being answered on average than non-suspect robocalls); iv) delivering the incoming call to voice mail or v) dropping or blocking the incoming call.

System Embodiment 51

The system of system embodiment 50,
wherein said first processor of said robocall detector device is further configured to control said suspect robocall detector device to store with individual calling party numbers of the identified calls in the suspect robocall database a probability that the individual called party number corresponds to an actual robocall; and wherein processing the incoming call further includes determining, based on the stored probability associated with the calling party number of a suspect incoming call, a call handling rule.

System Embodiment 52

The system of system embodiment 51, wherein handle the call as a suspect robocall includes determining what action to take based on the probability that the incoming call is a robocall.

System Embodiment 53

The system of system embodiment 52, wherein a higher probability that an incoming call is a robocall causes a lower call handling priority to be assigned than is assigned when an incoming call has a lower probability of being a robocall.

System Embodiment 54

The system of system embodiment 48, wherein said customer is an enterprise customer; and wherein said processor is further configured to control the operation of the suspect robocall detector so that said processing of call records of said customer is performed on a periodic basis for calls to said enterprise customer.

System Embodiment 55

The system of system embodiment 54, wherein said enterprise customer can control the periodic basis of said processing of call records to control to control the periodicity at which said database of suspect robocall calling party numbers is updated.

System Embodiment 56

The system of system embodiment 55, wherein said first processor is further configured to control said suspect robocall call detector to update said suspect robocall database, said update of said suspect robocall database including deleting from said list of suspect robocall calling party numbers telephone numbers which have not been identified as suspect robocall telephone numbers by the processing of said customer call records for a set period of time (e.g., remove numbers which have not been determined to be suspect for a day).

System Embodiment 57

The system of system embodiment 48, wherein said suspect robocall detector is a device external to said session border controller which routes calls to said enterprise customer.

System Embodiment 58

The system of system embodiment 57, wherein said comparing a calling party number of an incoming call to the calling party numbers in the suspect robocall database is performed by the session border controller for all calls directed to phone numbers corresponding to the enterprise.

System Embodiment 59

The system of system embodiment 58, wherein said suspect robocall database is a locally maintained database at a site of the enterprise customer.

System Embodiment 60

The system of system embodiment 59, wherein said suspect robocall database includes fewer records than a labeling database of reported possible robocalls used to identify characteristics of robocalls.

System Embodiment 61

The system of system embodiment 60 wherein said suspect robocall detector first processor is further configured to control said suspect robocall detector to: generate a call classification model to be used to identify possible robocalls, said generate a call classification model including: accessing a set of call detail records (CDRs) of the enterprise for a period of time (e.g., month); comparing calling party numbers in the accessed call records to the calling party numbers in an FCC consumer complaint database to identify calls which are from known or likely robocallers, said identified calls being a set of previously received suspect robocalls; generating from the call detail records of the set of previously received suspect robocalls, call pattern information indicative of a suspect robocall.

System Embodiment 62

The system of system embodiment 61, wherein said first processor is further configured to control said suspect robocall detector to generate from said call pattern information indicative of a suspect call one or more call classification models which can be used when processing new incoming calls to identify suspect robocalls.

System Embodiment 63

The system of system embodiment 62, wherein said first processor is further configured to control said suspect robocall detector to generate said one or more call classification models using a machine learning algorithm.

System Embodiment 64

The system of system embodiment 62, wherein said first processor is further configured as part controlling said suspect robocall detector to generate a call classification model to control said suspect robocall detector to generate from the call detail records of the set of previously received suspect robocalls, a set of call characteristics indicative of a suspect robocall.

System Embodiment 65

The system of system embodiment 64 wherein said first processor is further configured to control the operation of the suspect robocall detector to generate a call characteristic weight value for each of the characteristics of the set of call characteristics indicative of a suspect robocall.

List of Set of Exemplary Numbered Computer Readable Medium Embodiments

Computer Readable Medium Embodiment 1

A non-transitory computer readable medium including a first set of computer executable instructions which when executed by a processor of a suspect robocaller detector device cause the suspect robocaller detection device to perform the steps of: processing call records of said customer to identify calls which are possibly from a robocaller, based on at least one of i) a call characteristic (e.g., a media characteristic for the call such as jitter, latency, round trip time, or a SIP characteristic of the call such as order of SIP headers and/or parameters in a SIP invite message corresponding to a call, formatting of SIP headers and/or their values, and/or SIP body formatting and SIP body content) or ii) a call pattern, said call pattern including at least one of an error rate, call rate, call diversity or start-to-start time between adjacent calls from a call source (e.g., a network or enterprise, e.g., a VoIP network from which multiple calls are received), each identified call having a calling party number, and a second set of computer executable instructions which when executed by a processor of a call processing device (e.g., session border controller) cause the call processing device to perform the steps of: (i) processing an incoming call, said process an incoming call including comparing calling party source identification information (e.g., a calling party number) of an incoming call to the calling party source identification information (e.g., calling party numbers) in the suspect robocall database; and (ii) completing the incoming call in a standard manner if the incoming call is not in the suspect robocall database; and (iii) handling the incoming call as a suspect robocall if the incoming calling party source identification information (e.g., calling party number) is in the suspect robocall database.

The techniques of various embodiments may be implemented using software, hardware and/or a combination of software and hardware. Various embodiments are directed to apparatus, e.g., call processing devices, session border controllers, suspect robocall detector, classifiers, aggregators, aggregator & feature extractors, parser & aggregator, model parameterization, telecommunications systems, network nodes and/or network equipment devices. Various embodiments are also directed to methods, e.g., method of controlling and/or operating devices such as call processing devices, session border controllers, suspect robocall detector, classifiers, aggregators, aggregator & feature extractors, parser & aggregator, model parameterization, real-time communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., call processing device, session border controller, suspect robocall detector, classifier, aggregator, aggregator & feature extractor, parser & aggregator, model parameterization device, including a processor configured to implement one, multiple or all of the steps of one or more methods of the invention.

In some embodiments, the processor or processors, e.g., CPUs, of one or more devices, e.g., communications nodes such as call processing devices, session border controllers, robocall detectors are configured to perform the steps of the methods described as being performed by the communications nodes, e.g., session border controller, robocall detector, classifier, aggregator, aggregator & feature extractor, parser & aggregator, model parameterization device. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a call processing device, a signaling session border controller or robocall detector with a processor which includes a component corresponding to each of the steps of the various described methods performed by the device in which the processor is included. In some but not all embodiments a device, e.g., communications node such as a call processing device or session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of processing calls to a customer, the method comprising:
   processing call records of said customer to identify calls which are possibly from a robocaller, based on at least one of i) a call characteristic or ii) a call pattern, said call pattern including at least one of an error rate, call rate, call diversity or start-to-start time between adjacent calls from a call source, each identified call having a calling party number;
   storing calling party source identification information of the identified calls in a suspect robocall database;
   processing an incoming call, said processing including comparing calling party source identification information of the incoming call to the calling party source identification information in the suspect robocall database; and
   completing the incoming call in a standard manner if the incoming calling party source identification information is not in the suspect robocall database; and
   handling the incoming call as a suspect robocall if the incoming calling party source identification information is in the suspect robocall database.

2. The method of claim 1 wherein said calling party source identification information includes one or more of the following: a calling party number, a Session Initiation Protocol (SIP) agent string, an Internet Protocol (IP) address, a source Internet Protocol (IP) address, contact header information in a call initiation request, and content of first VIA header in a call initiation request.

3. The method of claim 1, wherein completing the incoming call in a standard manner includes completing the incoming call to a device corresponding to a called party number included in the incoming call without any indication that the incoming call is a possible robocall.

4. The method of claim 1, wherein handling the incoming call as a suspect robocall includes at least one of: i) completing the incoming call to a device corresponding to a called party number included in the incoming call with an indication that the incoming call is a suspect robocall; ii)

redirecting the incoming call to a validation service; iii) assigning the incoming call a lower incoming call priority than a non-suspect robocall when placing the incoming call in a call handling queue; iv) delivering the incoming call to voice mail or v) dropping or blocking the incoming call.

5. The method of claim 4, further comprising:
storing with individual calling party source identification information entries of the identified calls in the suspect robocall database a probability that the individual calling party source identification information entry corresponds to an actual robocall; and
wherein processing the incoming call further includes determining, based on the stored probability associated with the calling party source identification information of a suspect incoming call, a call handling rule.

6. The method of claim 5, wherein handling the incoming call as a suspect robocall includes determining what action to take based on the probability that the incoming call is a robocall.

7. The method of claim 1 further including:
processing a plurality of additional incoming calls to identify suspect robocalls based on the incoming calls' calling party source identification information, said processing including comparing calling party source identification information of said incoming calls to the calling party source identification information in the suspect robocall database, said processing of said incoming calls being independent of said processing call records of said customer to identify calls which are possibly from a robocaller.

8. The method of claim 1,
wherein said customer is an enterprise customer; and
wherein said step of processing call records of said customer is performed on a periodic basis for calls to said enterprise customer.

9. The method of claim 1, wherein said suspect robocall database includes fewer records than a labeling database of reported possible robocalls used to identify characteristics of robocalls.

10. The method of claim 9 wherein said processing call records of said customer to identify calls which are possibly from a robocaller includes identifying calls which are from a robocaller which are not included in said labeling database.

11. The method of claim 9, further comprising:
generating a call classification model to be used to identify possible robocalls, said step of generating a call classification model including:
accessing a set of call detail records (CDRs) of the customer for a period of time;
comparing calling party numbers in the accessed call records to the calling party numbers in at least one database of reported possible robocallers to identify calls which are from known or likely robocallers, said identified calls being a set of previously received suspect robocalls; and
generating, from the call detail records of the set of previously received suspect robocalls, call pattern information indicative of a suspect robocall.

12. The method of claim 11 wherein said call classification model is generated using a machine learning algorithm.

13. A system of processing calls to a customer, the system comprising:
a suspect robocall detector device including:
a first processor configured to control the suspect call detector device to process call records of said customer to identify calls which are possibly from a robocaller, based on at least one of i) a call characteristic or ii) a call pattern, said call pattern including at least one of an error rate, call rate, call diversity or start-to-start time between adjacent calls from a call source, each identified call having a calling party number, and
a first memory;
a suspect robocall database for storing calling party source identification information of the identified calls which are possibly from a robocaller;
a call processing device including:
a second processor configured to operate the call processing device to:
process an incoming call, said process the incoming call including comparing calling party source identification information of the incoming call to the calling party source identification information in the suspect robocall database; and
complete the incoming call in a standard manner if the incoming call is not in the suspect robocall database; and
handle the incoming call as a suspect robocall if the incoming calling party source identification information is in the suspect robocall database.

14. The system of claim 13 wherein said calling party source identification information includes one or more of the following: a calling party number, a Session Initiation Protocol (SIP) agent string, an Internet Protocol (IP) address, a source Internet Protocol (IP) address, contact header information in a call initiation request, and content of first VIA header in a call initiation request.

15. The system of claim 13, wherein said complete the incoming call in a standard manner includes completing the incoming call to a device corresponding to the called party number included in the incoming call without any indication that the incoming call is a possible robocall.

16. The system of claim 13, wherein said handle the incoming call as a suspect robocall includes at least one of: i) completing the incoming call to a device corresponding to the called party number included in the incoming call with an indication that the incoming call is a suspect robocall; ii) redirecting the incoming call to a validation service; iii) assigning the incoming call a lower incoming call priority than a non-suspect robocall when placing the incoming call in a call handling queue; iv) delivering the incoming call to voice mail or v) dropping or blocking the incoming call.

17. The system of claim 16,
wherein said first processor of said suspect robocall detector device is further configured to control said suspect robocall detector device to store with individual calling party source identification information entries of the identified calls in the suspect robocall database a probability that the individual calling party source identification entry corresponds to an actual robocall; and
wherein processing the incoming call further includes determining, based on the stored probability associated with the calling party source identification information of a suspect incoming call, a call handling rule.

18. The system of claim 13,
wherein said customer is an enterprise customer; and
wherein said first processor is further configured to control the operation of the suspect robocall detector so that said processing of call records of said customer is performed on a periodic basis for calls to said enterprise customer.

19. The system of claim 13, wherein said suspect robocall database includes fewer records than a labeling database of reported possible robocalls used to identify characteristics of robocalls.

20. The system of claim 19, wherein said first processor of said suspect robocall detector device is further configured to control said suspect robocall detector to:
- generate a call classification model to be used to identify possible robocalls, said generate a call classification model including:
- accessing a set of call detail records (CDRs) of the customer for a period of time;
- comparing calling party numbers in the accessed call records to the calling party numbers in at least one database of reported robocallers to identify calls which are from known or likely robocallers, said identified calls being a set of previously received suspect robocalls; and
- generating from the call detail records of the set of previously received suspect robocalls, call pattern information indicative of a suspect robocall.

* * * * *